PLAYBACK APPARATUS FOR MULTIPLE MAGNETIC TAPE CARTRIDGES

Filed June 8, 1965

INVENTOR
Franklyn G. Nickl
BY
Marvin Chaban
ATTY.

PLAYBACK APPARATUS FOR MULTIPLE MAGNETIC TAPE CARTRIDGES

Filed June 8, 1965

INVENTOR
Franklyn G. Nickl
BY
Marvin Chaban
ATTY.

INVENTOR
Franklyn G. Nickl
BY
Marvin Chaban
ATTY.

PLAYBACK APPARATUS FOR MULTIPLE MAGNETIC TAPE CARTRIDGES

Filed June 8, 1965

INVENTOR
Franklyn G. Nickl
BY
Marvin Chaban
ATTY.

INVENTOR
Franklyn G. Nickl
BY
Marvin Chaban
ATTY

INVENTOR
Franklyn G. Nickl
BY Marvin Chaban
ATTY.

INVENTOR
Franklyn G. Nickl
BY
Marvin Chaban
ATTY.

INVENTOR
Franklyn G. Nickl
BY
Marvin Chaban
ATTY.

PLAYBACK APPARATUS FOR MULTIPLE MAGNETIC TAPE CARTRIDGES

Filed June 8, 1965

INVENTOR
Franklyn G. Nickl
BY
Marvin Chaban
ATTY

INVENTOR
Franklyn G. Nickl
BY
Marvin Chaban
ATTY.

United States Patent Office 3,431,367

Patented Mar. 4, 1969

3,431,367

PLAYBACK APPARATUS FOR MULTIPLE MAGNETIC TAPE CARTRIDGES

Franklyn George Nickl, Santa Barbara, Calif., assignor to Canteen Corporation, a corporation of Delaware Filed June 8, 1965, Ser. No. 462,287

U.S. Cl. 179—100.2 9 Claims

Int. Cl. G11b 5/00

ABSTRACT OF THE DISCLOSURE

A sound reproducing tape apparatus employing a carriage having two movable head assemblies, each having two transducing heads, the four heads being offset from one another.

The carriage is mounted for linear movement relative the multiple cartridges by rotation of a single vertical lead screw. The movement of the carriage is controlled mechanically by a solenoid operated pin clutch, linkage, and gear train having conventional gears, and gear segments to raise or lower the carriage into engagement with a selected cartridge.

The present invention relates to playback apparatus for recordings and more particularly to improved apparatus for playing magnetic tape recordings in any one of a plurality of possible sequences.

The present invention is especially applicable for providing background music by playing a plurality of recordings automatically in any one of a number of sequences. In a preferred form of the invention, the recordings are reproduced on a plurality of magnetic tapes. Each magnetic tape is wound endlessly and is fitted in a rectangular cartridge. Each tape has a plurality (for as shown herein) of tracks, each track including a plurality of recordings spaced from one another along the tape. On a particular track, the individual recordings, which may be either commercial messages or musical pieces, are spaced from one another a short interval, measurable in seconds for the speed of movement of the tape. At one point, in each track, there is a spacing of longer interval signifying the end or start of a track.

With the apparatus set for one program, called mixed play, the operative transducer will play a recording on one track of the tape adjacent to the transducer. At the conclusion of the recording, the transducer will be physically moved to a position adjacent the next tape and will start to play a recording on one track on that tape. At the conclusion of that recording, the transducer head assembly will be moved adjacent a track on the next tape and thereafter continuing the sequence.

The operative sequence of the apparatus is such that on the sensing of the short interval silence period, such as that between individual recordings, the transducer shifts to the next tape, and activates the long duration sensing cycle. If a recording is transduced on the new tape, the sensing cycle is inactivated by the received signal. If, however, the long duration silent period continues indicating that no recording is being played, a transfer cycle is initiated to shift the transducers to the next tape. In this way, broken, defective, or missing tapes will be passed over due to the absence of a recording signal for the long duration period.

Using the present apparatus employing six tapes, each with four tracks bearing 2½ hours of programming, a completely varied program of 60 hours duration without any selection repetition, can be attained.

Another setting of the apparatus may provide for a continuous program, in which the program will be effected by first playing an entire track on one tape, shifting play to the next track on the same tape, playing it entirely, then following with the third and fourth tracks on the same tape. When all the tracks on one tape have been played, the system restores to allow the first track on the same tape to be replayed. In order to play recordings on other tapes, the player head assembly must be moved to the adjacent tape by actuation of a manual control switch.

With the framework set out generally, the present invention utilizes a single set of transducing heads within a transducer assembly. The set includes a transducer for each track, thus four transducers or transducing areas are provided for playing a tape cartridge completely. The switching or shifting of play from one track on a tape to another track on the same tape is performed electrically within the transducer control network. To transfer the play from one tape cartridge to another, the head assembly is physically indexed from a position adjacent one tape cartridge to a position adjacent the new tape cartridge to be played. Since the tracks are comparatively narrow in a physical sense, the tape must be guided into a playback position in which the various tracks are in physical proximity to the transducer head assembly. The desired transducer within the assembly is then energized to play the adjacent tape track so that the program may be played in the manner described.

To effect this operation, the present invention has as its object to provide a new and improved tape playback apparatus.

The invention has a further object to provide an improved magnetic tape playing apparatus in which the transducing heads are physically moved automatically from a position adjacent one tape to a position adjacent the next tape to be played.

It is a further object of the invention to provide a new apparatus for providing an automatic sequence as follows: first playing a recording on one tape, automatically physically restoring the one tape, moving the playing heads to an adjacent tape, and moving the adjacent tape into proximity with the playing heads for subsequent play.

These and other objects, features, and advantages of the invention will best be understood when viewed in conjunction with the accompanying drawings in which.

GENERAL DESCRIPTION

Figure 1:
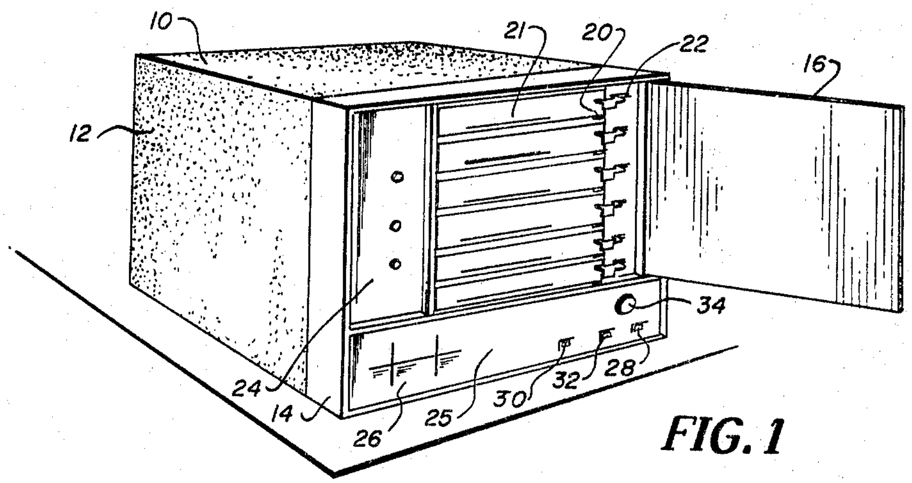
FIGURE 1 is a front view in perspective of a magnetic tape cabinet employing my invention, the cabinet door in this view being open to show the interior thereof.

In FIGURE 1, there is shown a magnetic tape playing cabinet 10, having conventional enclosing walls 12 of sheet metal or the like finished to provide an aesthetically acceptable design. The walls 12 are mounted on generally rectangular skeletal main frame 14 providing structural strength for the cabinet. Hinged to the front of the main frame 14 is an enclosing door 16, shown in its open position in FIGURE 1. The door covers and encloses a plurality of superimposed spaced tape cartridge compartments 20 each designed to bear a tape cartridge 21. Each compartment 20 has adjacent one side a cartridge positioning linkage mechanism 22 aligned with the cartridge carried in it. The door also covers a control panel 24 housing various control members, as will be explained.

Below the door, there is exposed a second control panel 25, shown best in FIGURE 2, with suitable indicia and visual signals (such as lamps) 26, to indicate the identifying number of the tape cartridge which is being played at any given time. Other control members on panel 25 include a Power Control or On-Off Switch 28, a Sequence Control Switch 30 and an Advance Control Switch 32, all of which are accessibly located on the front of the cabinet frame. Switch 30 called the Sequence Control Switch has two stable positions, respectively, called Mixed and Continuous. In the continuous position, the apparatus will play continuously on a track and at its conclusion will switch to the next track on the same tape to play it through. The Mixed position controls the physical movement of transducer assembly from tape to tape after each selection to play through the entire program. Switch 32 has one stable condition closed to contact 32.1, and automatically restoring to its normal condition on release of the momentary manual actuating pressure. This switch 32 is called the Advance Switch since its function is to transfer play from one tape cartridge to the next. A conventional power light 34 is associated with switch 28, the light glowing when the apparatus is operating.

GENERAL CONSTRUCTION

Figure 2:
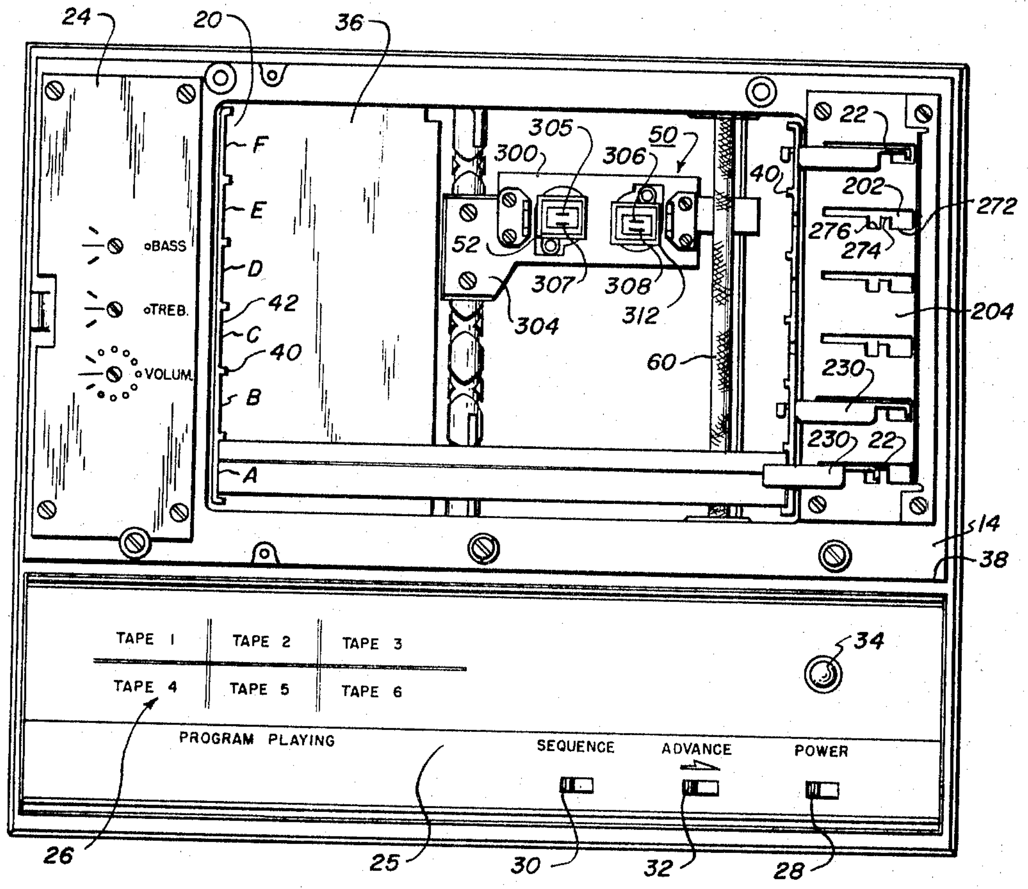
FIGURE 2 is a front view in elevation of the cabinet of FIGURE 1 with its door open and with the upper tape cartridges removed.
Figure 3:
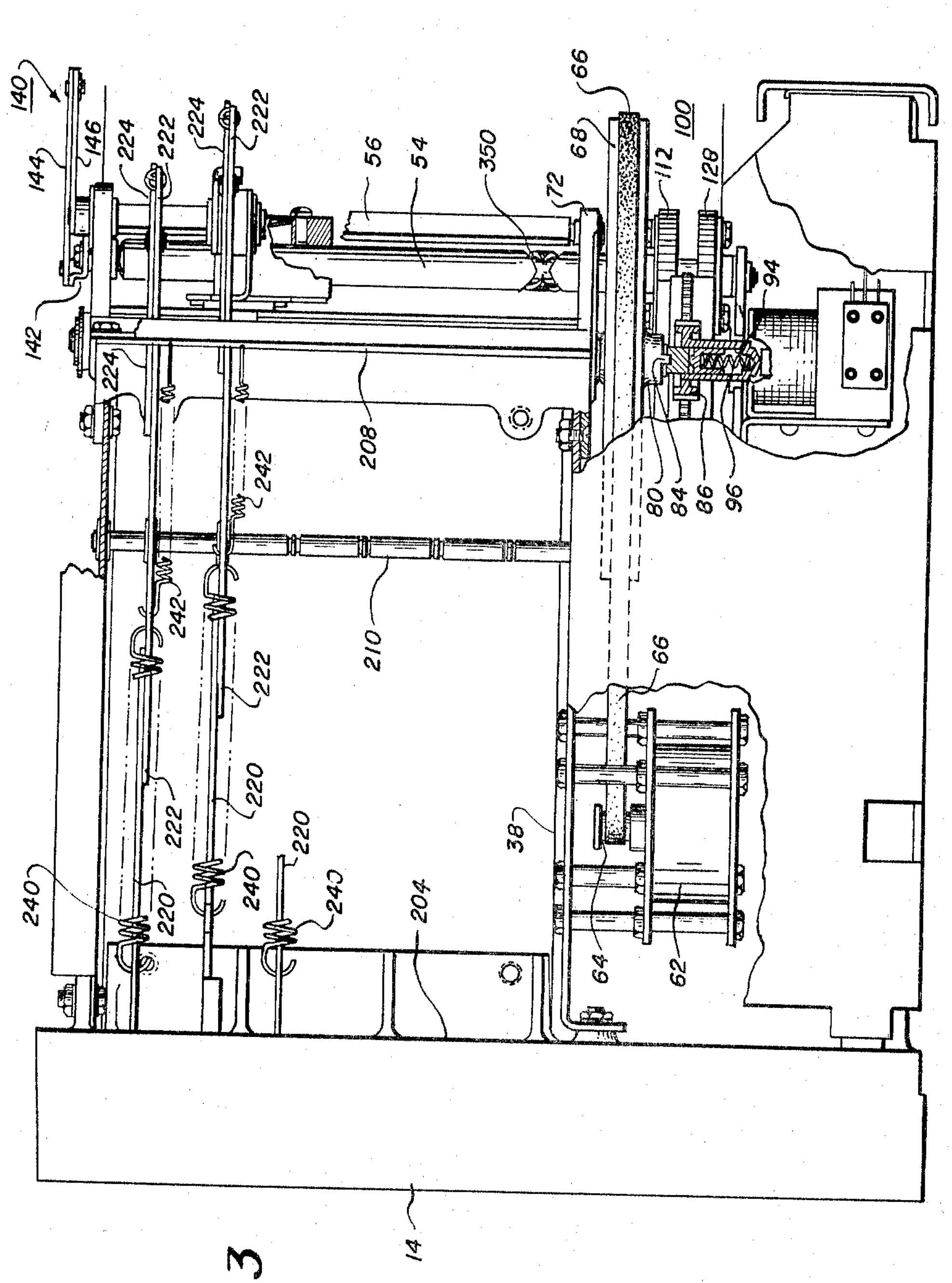
FIGURE 3 is a side view in elevation of the cabinet with the side wall removed and the lower base side wall partially broken away.

Viewing FIGURE 2, there can be seen a single tape cartridge 21 in the lowermost of the cartridge compartments 20. The cartridge compartments, six in number, one above the other, may for convenience be designated A, B, C, D, E, and F reading upwardly. These compartments combinedly form a central cavity 36 above a base plate 38, with the base plate being secured to mounting frame 14 to form a floor below the lowermost or A compartment. The cavity 36 is generally open to receive a plurality of tape cartridges 21 in superimposed spaced relationship.

Figure 8:
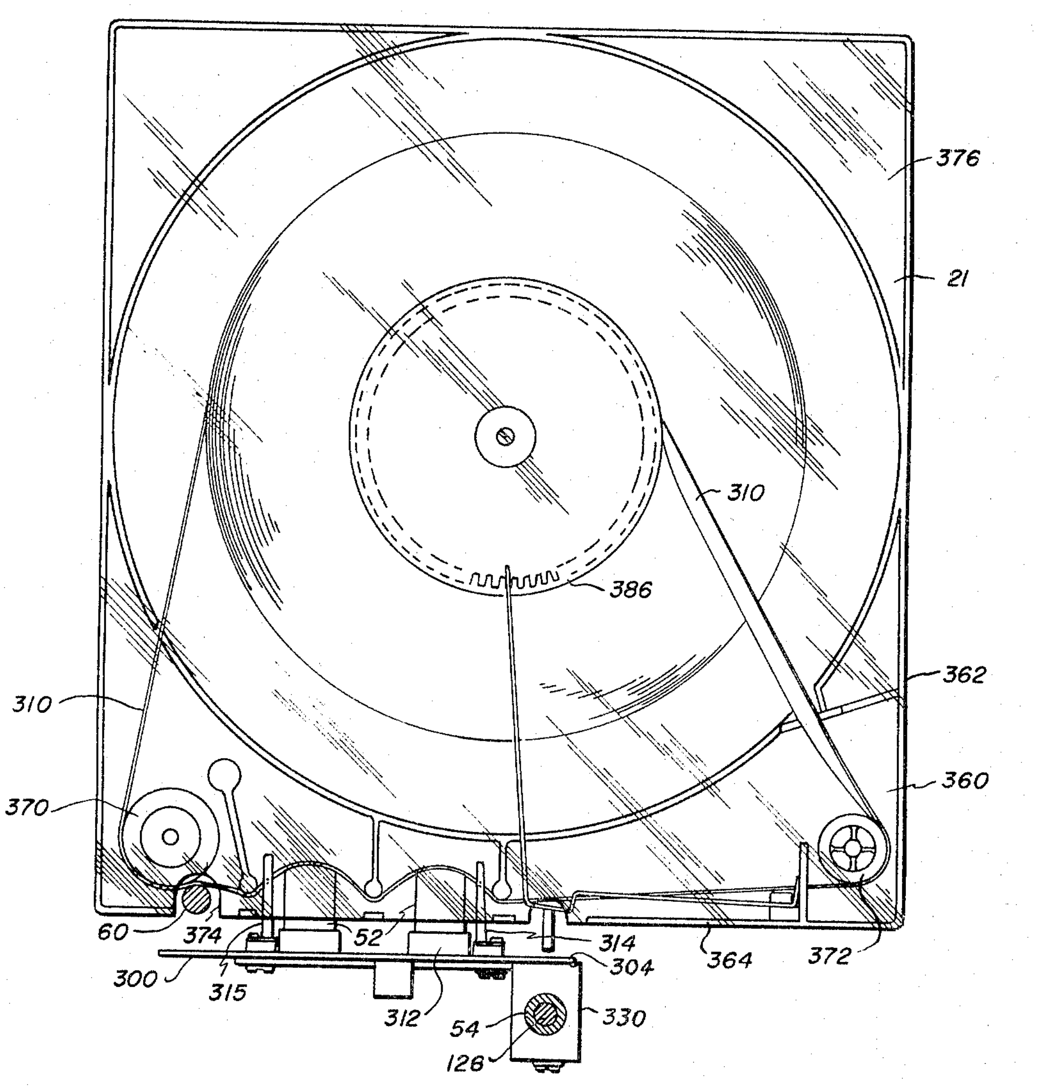
FIGURE 8 is a plan view of a magnetic tape cartridge with its tape in operative contact with the transducer assembly.

Each tape cartridge 21 as used in the apparatus shown, may be of any of the commercially available types, but preferably is of the type shown best in FIGURE 8 plan view. Each cartridge holds an endless tape exposed at one end in a tape support medium which is rectangular in plan with comparatively large width and length and comparatively shallow height or thickness. To accept these cartridges each compartment is of comparatively large width and length and comparatively shallow height. Each compartment is defined by upper and lower slide guide rails 40 intruding slightly into the center cavity of the cabinet from lateral supporting walls 42 and 44 which extend horizontally rearwardly for about three fourths of the front-to-rear depth dimension of the cabinet. These walls 42 and 44 may be integral to the main frame 14 or alternatively may be affixed to the frame. These walls 42 and 44 form the enclosing walls of the compartment cavity 36 while the guide rails 40 divide the cavity into the individual compartments.

Operatively associatable with each cartridge positioning mechanism 22 is the common transducer assembly 50. This assembly has two transducing heads 51 and 52 mounted in it, the transducing heads seen best in FIGURE 2, extending forwardly into the central cavity of the compartments. These transducing heads and their mounting within the assembly are generally of the type shown in U.S. Patent 3,158,374, issued to Franklyn G. Nickl on Nov. 24, 1964, for Transducer Heads. It should be noted that the transducer assembly 50 of the current invention is mounted for vertical movement on two vertical support columns, lead screw 54 at its one side, and bracing rod 56 at its other side. Bracing rod 56 is a square in section and is mounted in bearings at top and bottom to allow oscillatory motion of the rod about its central axis. This rod acts as a vertical motion guide for the transducing assembly, and also acts to position a cartridge for play. The lead screw acts as a vertical motion guide and in addition provides the elevating drive for the vertical movement of the assembly. This lead screw, sometimes called a level wind screw or double threaded transfer screw, is rotated by a gear train assembly to perform this elevating function as will be described in detail.

In FIGURE 2, there can be seen a third extended length vertical shaft, capstan 60. This capstan as shown is rotated continuously during operation of the apparatus to grip and drive a magnetic tape during playing thereof, as described in the previously cited patent. The captan 60 may have an outer knurled surface or alternatively, may have a smooth, hard outer surface. The capstan is aligned in the same front-to-rear plane as the bracing rod 56 and is spaced forwardly thereof in position to contact the magnetic tape at the rear, exposed edge of a cartridge.

The mechanical drive for the capstan, the lead screw, the bracing rod, the transducer assembly, and the cartridge positioning mechanism is effected by a main drive motor 62.

Other necessary electrically operated elements such as solenoids, control relays, transformers, control steppers, and the like, are mounted on the main frame 14 or base plate 38 for structural rigidity, mostly in the area below base plate 38 adjacent its rear.

*Drive mechanism*

Under the general heading of drive mechanism, there will be described the construction and structure of the elements responsive to the rotation of the main drive motor 62. Motor 62, a high quality, capacitor start, synchronous motor, is mounted by suitable brackets or the like on the underside of the base plate 38 toward the front of the cabinet. A split phase motor of high quality also may be used, although this capacitor start motor has been shown herein. With either type of motor, the motor drive shaft 64 extends vertically above the motor and terminates below base plate 38. Fitted about a small diameter pulley on shaft 64 is an endless drive belt 66 which is also secured about the periphery of an enlarged pulley of flywheel 68. The diameter of flywheel 68 is much greater than that of the pulley on drive shaft 64, so that a first reduction of the motor output speed is effected. The flywheel is a large die cast wheel with the capstan 60 mounted on the wheel at its rotational axis. The capstan may be pressfitted into the flywheel for joint rotation therewith.

The capstan 60 extends upwardly from its mounting in the flywheel through a suitable bearing 70 near the rear edge of the base plate 38. Extending rearwardly from base plate 38 past bearing 70 is a horizontal stationary mounting bracket 72. Adjacent the rear end of mounting bracket 72, within a suitable bearing 74, there is mounted the vertically extending bracing rod 56. As mentioned previously, this rod is mounted for oscillatory rotation about its own vertical axis.

Mounted on the underside of flywheel 68 on its rotative axis is a pin clutch 80. This clutch includes a stub shaft 82 with two opposed pins 84 extending downwardly adjacent the stub shaft periphery. The stub shaft and pins rotate with the flywheel and may in one form of construction be integrally cast as a unit with the flywheel.

Poised below the clutch 80 is a spur 86 which may be fabricated of Teflon material, nylon material, or the like. Spur 86 has conventional spur gear teeth 88 on its periphery, and has an internal opening 90 in the shape generally of an upwardly open Maltese Cross, the cross being centered on the rotative axis of the flywheel and stub shaft. Gear 86 is normally maintained below the clutch pins and out of engagement therewith. Mounted coaxially below the gear 86 is a solenoid 92 whose plunger 94 is operably secured to the gear shaft. On energization of the solenoid 92, the plunger 94 is raised thereby elevating the gear wheel 86. As the gear wheel rises, the recesses of the cross opening 90 receive the clutch pins 84 and couple gear wheel 86 to flywheel 68 for joint rotation. A restoring spring 96 is connected to the solenoid plunger, so that deenergization of the solenoid will drop gear wheel 86 and disengage the drive coupling between the flywheel 68 and gear wheel 86 at the clutch coupling.

On an axis parallel to the axis of gear wheel 86 is a multilevel spur gear assembly 100. One central level of the multiple level gear assembly 100 is a spur gear 102 of Teflon material or the like which is in mesh with gear wheel 86 to be driven thereby.

The diameter of the engaging spur gear 102 is much greater than that of driving gear 86, so that a second motor speed reduction is effected between the speed of rotation of the capstan and flywheel and that of the shaft 104 of multiple level gear 100.

Mounted on shaft 104 above the engaging spur gear 102 is an intermittent gear 106 of slightly smaller diameter than spur 102. Intermittent gear 106 has a spur gear toothed portion 108 extending about its periphery for slightly less than 180°. The remaining portion 110 of the circumference of intermittent gear 106 is recessed to the root diameter of the gear without teeth.

This intermittent gear 106 is positioned to mesh with a small diameter spur gear 112 mounted on the rotative axis of the level wind lead screw 54 adjacent its bottom end for joint rotation. Thus, when gear 112 is rotated by the toothed portion 108 of spur gear 106, the lead screw 54 rotates.

Below the engaging spur gear 102 is a second intermittent gear 120. This gear has a toothed portion 122 covering slightly less than 180° of the gear periphery, and a recessed portion 124 extending about the remainder of the periphery at the root diameter of the toothed portion. The toothed portion 122 of lower gear 120 is angularly positioned 180° out of phase with the toothed portion 108 of the upper intermittent gear 106. At either end of the toothed portion 108 of upper intermittent gear, its recessed portion 110 overlaps small angular area of the recessed portion 124 of the lower intermittent gear 120. Gear 120 is positioned with its shaft parallel to a shaft 126 bearing a spur gear 128 which meshes with the toothed portion 122 of intermittent gear 120. Gear 128 is of the same diameter, pitch, etc. as the lead screw gear 112 and naturally the two intermittent gears 106 and 120 are of the same diameter and same tooth spacing and proportion. It should be noted that the diameter of gears 112 and 128 are one-half the size of the diameter of gears 106 and 120. Gear 128 will be called herein the crank driving gear and shaft 126 the crank drive shaft.

Crank drive shaft 126 is nested coaxially for most of its length within the lead screw 54 and each is rotatable relative to the other. Shaft 126 rests in bearings 130 on a horizontal supporting plate 132, this latter plate extending rearwardly from base plate 38 also serving as the mounting for solenoid 92. The lead screw terminates at its upper end in bearings 134 within the horizontally disposed stationary mounting bracket 136 extending rearwardly of the cabinet main frame 14 adjacent its upper end. The crank drive shaft 126 extends through the bearing 134 and mounting bracket 136 of frame 14 to a connection at its upper end to the crank mechanism 140 which controls the movement of the cartridge positioning mechanisms 22, as will be explained later.

The crank mechanism 140 is used to convert the rotary motion of shaft 126 to periodic oscillatory motion of bracing rod 56. Mechanism 140 includes a first rotatable arm 142 connected to the top end of inner shaft 126 to rotate therewith. Arm 142 is connected at a pivot point near its free end to one end of a connecting rod or crank arm 144. This connecting rod 144 is connected at its other end to one end of a periodic pivotal arm 146, arm 146 being connected at its other end to the bracing rod 56. Bracing rod 56, as mentioned previously, is square in cross section, and extends from bearing 74 in lower stationary bracket 72 upwardly through an upper stationary bracket 148 to the connection to pivotal arm 146. Thus, rotation of lower intermittent gear 120 causes the toothed portion 122 to mesh with crank drive gear 128 to rotate the inner shaft 126 and operate the crank mechanism to periodically oscillate the bracing rod, the results of which will be explained in greater detail later.

Also mounted on shaft 104 of the multilevel gear assembly 100 is the lowermost spur gear 150. This gear, of small diameter, is meshed to a larger gear 152, the primary member of an output gear train 154. The output gear of train 154 rotates two wipers 162 and 164 of a two-level rotary switch mechanism 168. The speed reduction in gear train 154 causes mechanism 168 to make 1/12 of a revolution, for each revolution of shaft 104.

Shaft 104 extends below its mounting to support plate 132 and bears thereon wipers 155, 156, and 157 of a three-level rotary switch 160. The wipers of switch 160 are driven directly by shaft 104 of the intermittent gear, so its wipers 155, 156, and 157 make one complete revolution for each revolution of shaft 104.

*Cartridge positioning mechanism*

The apparatus shown is equipped for six cartridges 21, one within each of the vertically superimposed compartments 20, the compartments and their respective cartridges being labelled A–F in ascending order. Each of these compartments, as mentioned earlier, is bounded by the two vertical side walls 42 and 44 with horizontal guide rails 40 to separating the individual compartments.

Along the right side of each compartment, as viewed in FIGURES 1 and 2, there is an individual cartridge positioning mechanism or linkage 22. These mechanisms are individually mounted to extend between recumbent F-shaped slots 202 in front interior wall 204 and the horizontally elongated, rectangular slots 206 in rear interior wall 208. The interior walls 204 and 208 extend transversely from the front and rear edge of the compartment central cavity 36 to the outer edge of frame 14 and may comprise part of the frame. A single vertical aligning rod 210 is mounted on base plate 38 intermediately along the cabinet depth. Rod 210 passes through a slot 212 in each positioning mechanism 22 to align and maintain the mechanisms in superimposed relationship.

The linkages 22 are identical in construction for all the compartments and one representative mechanism will be described in detail, it being understood that the remaining mechanisms 22 are identical to the one described. The construction details of a representative mechanism 22 can best be seen in FIGURES 3, 6, 7, and 9. Each mechanism is a horizontally disposed linkage made up of three joined links, a front link 220, an intermediate slide link 222, and a rear link 224, each pivotally connected to the adjacent link. The links are flat and may be fabricated or formed of sheet metal, these links combinedly acting to advance a cartridge from an inactive or inoperative position to a ready position, and to a play position.

The front link 220 at its front end has an integral stepped flange 226 offset in the plane of the main body 228 of the link laterally in the direction of cartridge compartment 20. Flange 226 has a manually graspable, downwardly stepped front tab 230, and spaced rearwardly from tab 230 along the rear edge of flange 226 a vertically disposed cartridge pushing finger 232. Along the main body portion 228 of link 220, at the outward side (the side opposite the stepped flange 226) there is a downturned flange 234 of comparatively short extent. Toward its rear edge, the link 220 has a pin-in-slot connection with intermediate link 222. A pin 236 is fastened to front link 220 and protrudes through a front-to-rear elongated slot 238 in intermediate slide link 222. A comparatively heavy tension spring 240 connected to both front link 220 and intermediate link 222 couples the two links together and normally biases the front link rearwardly.

The intermediate link 222 is constrained to essentially front-to-rear slide motion. A tension spring 242 exerts a comparatively light rearward pressure on slide link 222 through the connection of the spring front end to the front of link 222 and by the connection at the spring rear to the edge of rear wall 208 of frame 14. This intermediate link 222 extends rearwardly with a clearance fit through the slot 206 in the rear interior wall 208 and has a stepped rectangular hook member 250 extending at its remote end into the adjacent cartridge compartment 20. A stepped cartridge pushing finger 252 extends vertically from the front edge of the hook member 250.

A T-shaped rear link 224 is pinned at a pivot connection 254 to intermediate link 222, pivot 254 being intermediate along the T crosshead 256. The forward end of the T crosshead 256 extends through the wall slot 206 above and parallel to intermediate link 222. At the rear end of crosshead 256 is a spring holder 258. The leg 260 of the T extends atop a planarly stepped portion 262 of the slider link 222, the stepped portion terminating in a spring holder 264 which receives and holds one end of a light tension spring 266, the spring being supported at its other end in spring holder 258 of T crosshead 256. In the outer surface 268 of the crosshead 256 is incised a rectangular notch 270 which is positioned to latchingly engage the edge of slot 206 in rear frame wall 208 to hold the entire linkage in its forwardmost condition.

With the construction described, the intermediate link is constrained to front-to-rear slide motion by its fit through wall slot 206, its connection to front link 220 and by aligning rod 210, and is drawn rearwardly by the bias of tension spring 242 toward rear wall 208. The front link 220 is pivotal and slideable with respect to slider link 222 although the heavy pressure exerted by spring 240 couples the two links 220 and 222 closely together. The rear link 224 is pivotal with respect to the slider and is drawn toward a parallel relationship with the slider link by the action of rearmost spring 266.

As mentioned previously, each cartridge positioning mechanism 22 is aligned alongside a cartridge compartment 20 with the front link 220 extending through the F-shaped slot 202. This front link may be manually set into either one of two positions, the inactive position or the ready position. The inactive position is that in which the cartridge adjacent the cartridge positioning mechanism 22 is freed of engagement with its cartridge and its cartridge will not be played during the advance of the transducer head assembly. In the inactive position of the cartridge positioning mechanism 22, side flange 234 of front link 220 is positioned within the outermost notch 272 of slot 202 with flange 234 abutting against prong

274. Prong 274 is the dividing member between the outer notch 272 of the recumbent F slot 202 and the inner notch 276. When flange 234 rests in notch 272, the front link 220 is held away from engagement with its cartridge.

To place a cartridge in the ready position, the front link vertical tab 230 is grasped manually and drawn forward. The entire linkage is slideably drawn forward against the effect of spring 242. The heavy tension spring 240 couples links 220 and 222 together to effect the joint slide motion. As front link 220 is drawn forward, flange 234 is drawn forward of prong 274 and the flange slides into the central notch 276 of slot 202. In this, the ready position, the front cartridge pusher finger 232 exerts a rearward force on the front of its cartridge. The cartridge is however, restrained from rearward movement by the latching engagement of the edge of slot 206 in the notch 270 of rear wall 208.

With the cartridge positioning mechanism in the ready condition, its cartridge can be advanced into contact with the drive capstan (play position) in the following manner by the action of crank mechanism 140. A pointer arm 280 with an offset tip is movable with transducer assembly 50, is pivotal (as will be explained later) rearwardly against T leg 260 of the link 224 of the linkage 22 adjacent the assembly 50 at any given time. The front edge of this leg 260 extends slightly in front of the stepped portion 262 of link 222. Thus, link 224 is struck by the pointer arm 280. Link 224 is pivoted against the action of spring 266 and projects the forwardmost end of crosshead 256 inwardly to free notch 270 of its engagement with the edge of slot 206. The entire linkage slides rearwardly under the effect of tension spring 242.

The front push finger 232 of the linkage in question pushes its cartridge rearwardly. The rear push finger 252 is moved rearwardly out of the path of the cartridge by the slide motion of the linkage mechanism, and the cartridge is pushed or advanced into contact with capstan 60. This position of contact between a cartridge and the capstan is called the play position (see FIGURE 7). The linkage is held in the play position by pointer arm 280 maintaining its engagement with the front edge of leg 260 of link 224 and the stepped portion 262 of link 222.

When a cartridge being played is to be removed from the play position, pointer arm 280 is pivoted frontwardly by the crank mechanism 140. The pointer arm strikes the stepped hook 250 of link 222 and drives link 222 forwardly. This link carries link 224 until notch 270 mates with the edge of slot 206. Link 224 pivots under the effect of spring 266 to latch the linkage in the forward or ready position. The cartridge is pushed by the forward motion of rear push finger 252 during the spring biased movement of linkage 22 to the ready condition.

TRANSDUCER HEAD ASSEMBLY AND MOUNTING

Figures 4, 5:
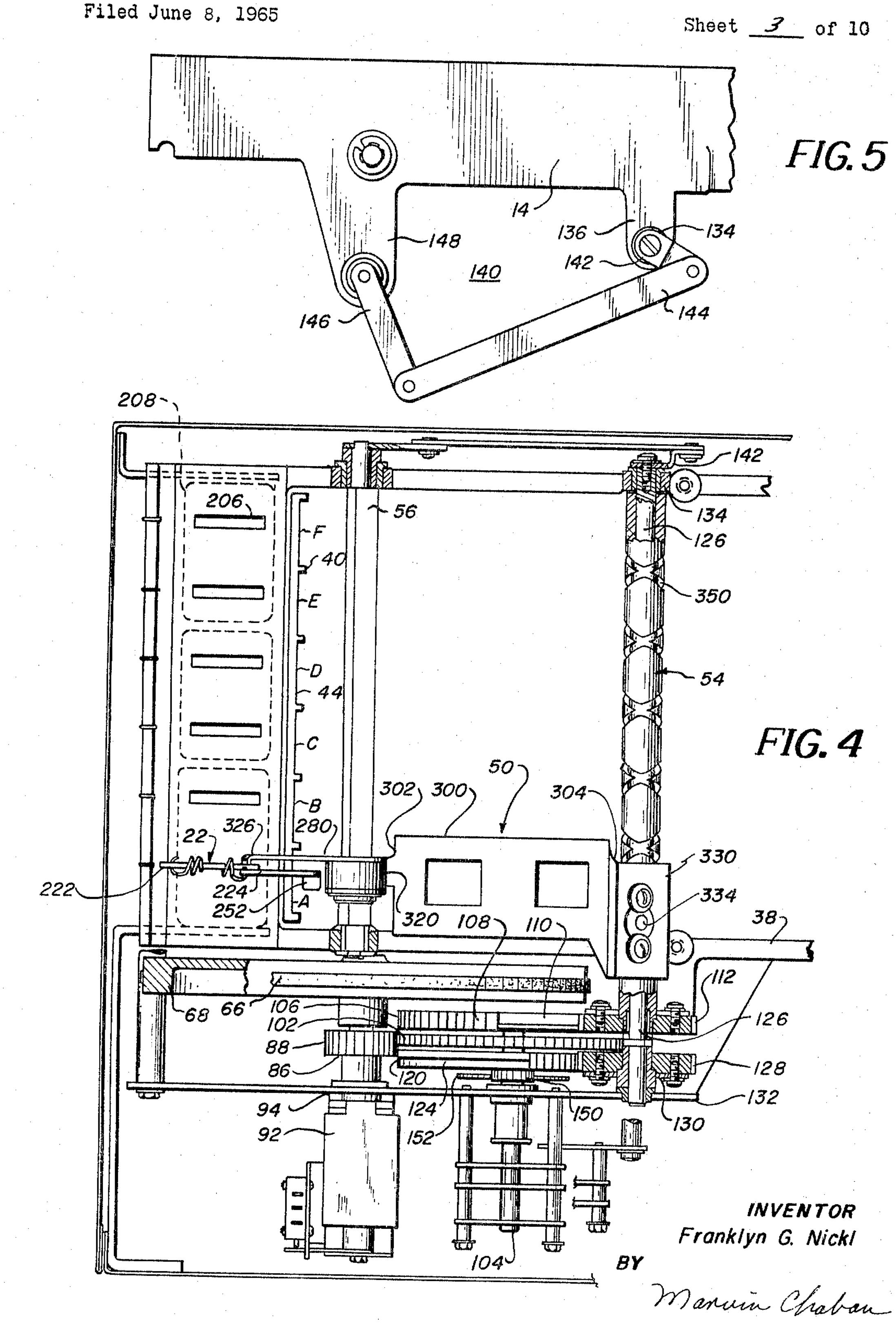
FIGURE 4 is a partial rear view in elevation of the cabinet showing the operative mechanism of the apparatus in detail with the upper cartridge positioning mechanisms removed.
FIGURE 5 is a partial top view of the bell crank mechanism used to control the cartridge positioning mechanism.
Figure 9:
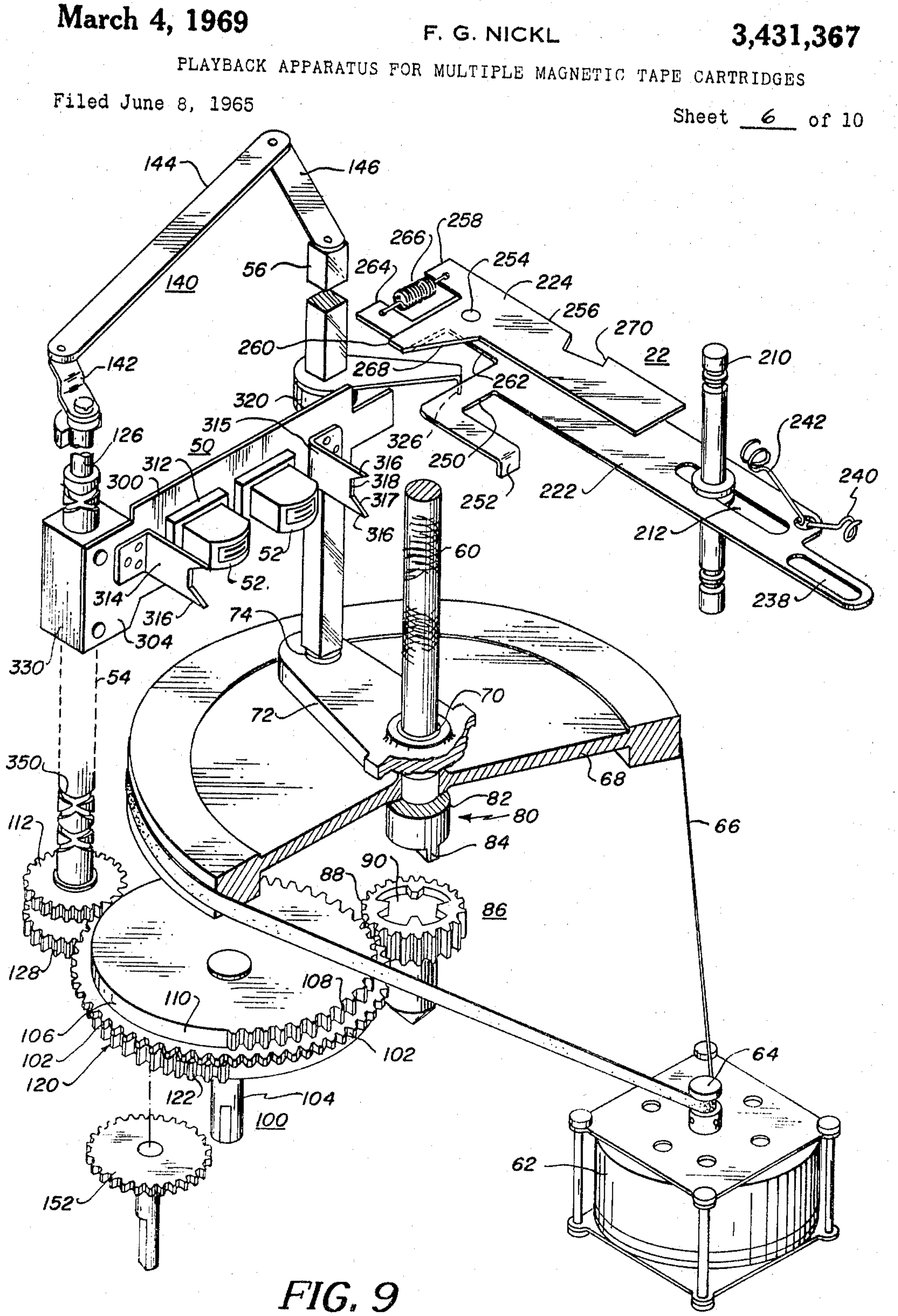
FIGURE 9 is a perspective view of the operative mechanism of the invention, the elements shown partially exploded to show operative relationship.

The transducer assembly 50 is shown best in FIGURES 2, 4, and 9. The assembly 50 comprises a rectangular mounting plate 300 with mounting brackets 302 and 304 at either end. Two transducing or pick-up heads 51 and 52 are mounted on the plate 300 vertically offset laterally from one another. Each head has two vertically, offset, spaced apart transducers or pick-up areas 305 and 307 on head 51, 306 and 308 on head 52, so that each of the four vertically spaced apart tracks on a tape 310 in cartridge 21 is adjacent one of the tracks 305–308.

The individual transducer heads are partially embedded in the front end of a housing 312 which may be made of plastic. The rearmost end of each housing 312 is provided with a circular opening which extends to the rear of the transducer heads, so that electrical connections may be affixed to the individual transducers. The housings may be mounted adjustably with respect to the transducer assembly as described in the cited Patent 3,158,374. In any event, the heads 51 and 52 extend forwardly of plate 300 into the central cavity 36.

Mounted to the assembly mounting plate 300 are two tape guides 314 and 315. These guides shown best in FIGURES 2 and 9 extending forwardly parallel to the heads 51 and 52. These guides may be made of Teflon or other suitable rigid synthetic resins. These guides are accurately aligned and positioned with respect to the transducer heads and these guides are permanently affixed to the mounting plate to maintain their position relative to the heads.

Each tape guide has two inwardly tapered fingers 316 spaced apart a distance sufficient to support a tape 310. The tapering finger surfaces 317 lead into surface 318 parallel to the heads and aligned therewith. A tape 310 being brought into proximity with heads 51 and 52 is pushed toward the heads and is accepted within the tape guide fingers 316. The fingers 316 channel the tape along surfaces 317 into alignment with the heads, the tape thereupon resting in plane contact with surfaces 318.

Tape guides 314 and 315 are permanently mounted to assembly plate 300 in alignment with the heads. These guides being part of the transducer assembly are moved with the assembly while maintaining their position relative to the transducing heads. These guides will compensate for minor differences in tape positioning in drawing a tape into contact with the transducing heads, due to the permanent positioning of the guides with respect to the heads.

Brackets 302 and 304 mount the transducer assembly 50 on lead screw 54 and on bracing rod 56 in a manner allowing controlled vertical motion of the assembly 50. Bracket 302 is configured with a horizontal offset brace 320. At its remote end brace 320 has an opening fitted about bracing rod 56. Brace 320 acts as the mounting base for a cylindrical bearing 324 which fits about square bracing rod 56. Atop the bearing 324 is the oscillating pointer arm 280, which at its free end has a downwardly directed stepped tip 326. Brace 320, bearing 324, and pointer 326 are fastened together for joint vertical movement with bracket 302 along the bracing rod 56. Bracket 302 is constrained to solely vertical motion while the bearing 324 and pointer arm 280 periodically oscillate with the square rod during its periodic movements.

Figure 14:
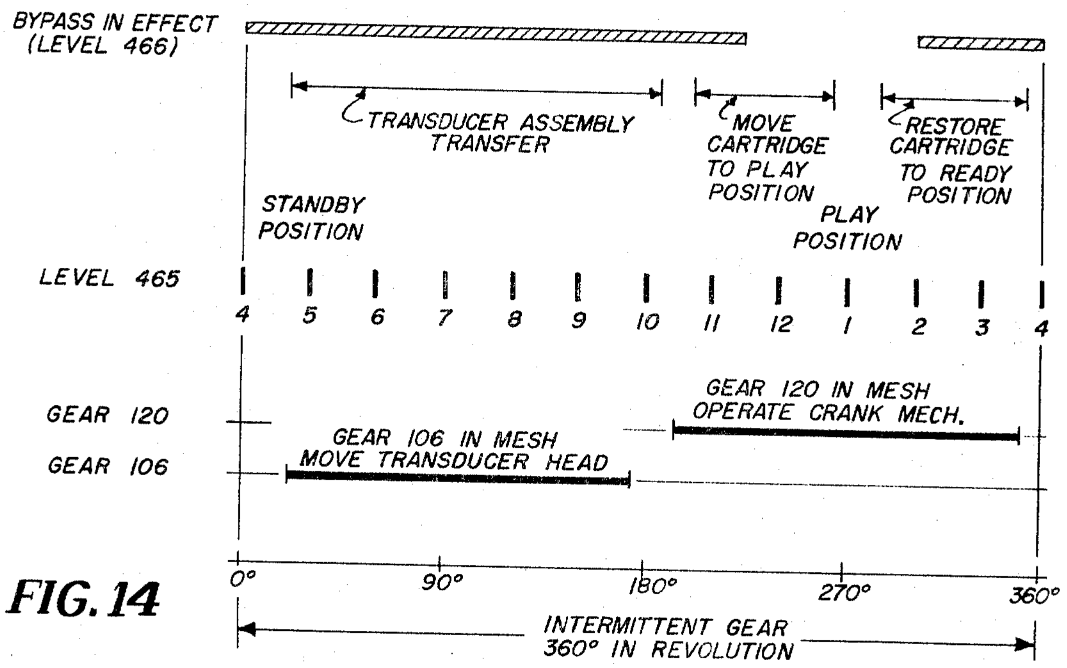
FIGURE 14 is a sequence diagram for the intermittent gear assembly.

At the end remote from the transducer assembly, bracket 304 is fastened to the front side of a rectangular block 330. Block 330 has a vertical bore 332 fitted about lead screw 54 with a close tolerance fit. To control the relative motion between the block and the lead screw, a coupling dog 334 is mounted in the block. To accept dog 334, the block has a second bore 336 extending horizontally, bore 336 being perpendicular to the lead screw bore 332 and in open communication therewith. The dog 334, shown best in FIGURES 14 and 15, has a cylindrical base 340 which is sized to fit snugly into horizontal bore 336. From the base 340, a crown protrudes, the crown having opposed prongs 344 spanned by an arcuate concave bridge 346. The dog 334 is held in bore 336 by the compressive action of a spring washer 348 held in bore 336 at the rear of the dog base 340.

The bridge 346 of dog 334 rides in groove 350 of lead screw 54 to convert the rotary motion of lead screw 54 into vertical movement of both block 330 and the transducer assembly 50. The lead screw of transfer screw 54 is double threaded with the thread groove intersections spaced 0.90 inch apart along the screw axis. For each revolution of the transfer screw, the block and transducer assembly advance 0.90 inch. This distance (0.90 inch) is the vertical center to center distance of the cartridge compartments. Thus, each revolution of the transfer screw moves the transducer assembly one compartment spacing.

As mentioned previously, the lead screw or transfer screw 54 is double threaded with oppositely directed thread grooves 350 intersecting at intervals of 0.90 inch. Vertically there are six intersections spaced along the screw. At both the top and bottom, the oppositely directed thread grooves 350 merge into one another. With this construction, the coupling dog 334 and the transducer assembly driven thereby will be driven to the top by rotation of the lead screw and will thereafter be directed downwardly on continued rotation.

A similar but conversely directed change of direction will occur when the bottom of grooves 350 is reached.

Also mounted on block 330 is a set 352 of electrical contactors or leaf springs. The set includes four contractors 355, 356, 357, and 358, horizontally extending from block 330 although insulated from the block and from each other. The contactors are each electrically connected to one of the transducing areas or transducers 305–308. These contactors move with the transducer assembly and at each tape compartment make contact with stationary terminals or conductors representative of the tracks on the various tapes.

*Tape cartridge*

A tape cartridge 21 (see FIGURE 8) of the type used herein may be of the type shown in U.S. Patent 3,161,362, issued to K. R. Smith on Dec. 15, 1964. The cartridge is a rectangular structure sized to fit within a compartment 20. The cartridge has an opaque flat tray 360 with upstanding walls 362 on all four sides. In one side 364, the wall and tray base have a series of arcuate semicircular cutouts. An endless magnetic tape 310 is coiled about a central hub 368 and is fed from the hub to a rectilinear traverse past a pair of spaced rollers 370 and 372 at the opposed corners of the cut away side 364 and is returned to the outside of a coil about the hub. One cutout 374 in the tray 360 is adjacent the roller 370 drawing the tape from the hub. This cutout 374 is sized to accept the capstan 60 in driving contact with the roller to drive the tape past the transducing heads.

The top of the cartridge is covered by a transparent covering 376 protecting the tape, so that the tape 310 is exposed only along its rectilinear traverse at the cutouts along the open side 364.

The tape in its vertical dimension has four spaced sound tracks each of which may be played indvidually. With tape in its normal position in the cartridge, the tape tracks are spaced vertically from one another. Naturally, in the playing position, the transducers are aligned with the tracks, so that each track may be associated with a particular transducer.

Along each track on the tape, there are spacings of short duration at the end of each selection or number. One position on the tape is designated as the end, and is characterized by a spacing on which no recording has been made thereon. With the tape traveling at its normal speed, the between-selection spacing is slightly greater than 5 seconds while the tape and spacing between recorded areas is somewhat longer than 25 seconds of tape traverse.

*Mechanical operation*

The mechanical operation of the drive mechanism to move the transducer assembly 50 from a position adjacent one cartridge compartment to a position adjacent another compartment will now be explained, especially in conjunction with the showing of FIGURES 2, 4, and 9.

Assume that the transducer assembly 50 is resting opposite the A or lowest compartment, that all compartments have cartridges, and that all cartridges are held in the ready position by their respective cartridge positioning mechanism 22. With the drive mechanism in this condition, all cartridges are held away from contact with the capstan.

Within the multilevel drive gear assembly 100, the upper intermittent gear 160 is in mesh with the lead screw gear 112 at the start of the toothed portion 108 of the intermittent gear. The lower intermittent gear 120 is out of mesh with the crank mechanism drive gear 128; the lower intermittent gear being at the start of its recessed or nondriving portion 124.

Figure 6:
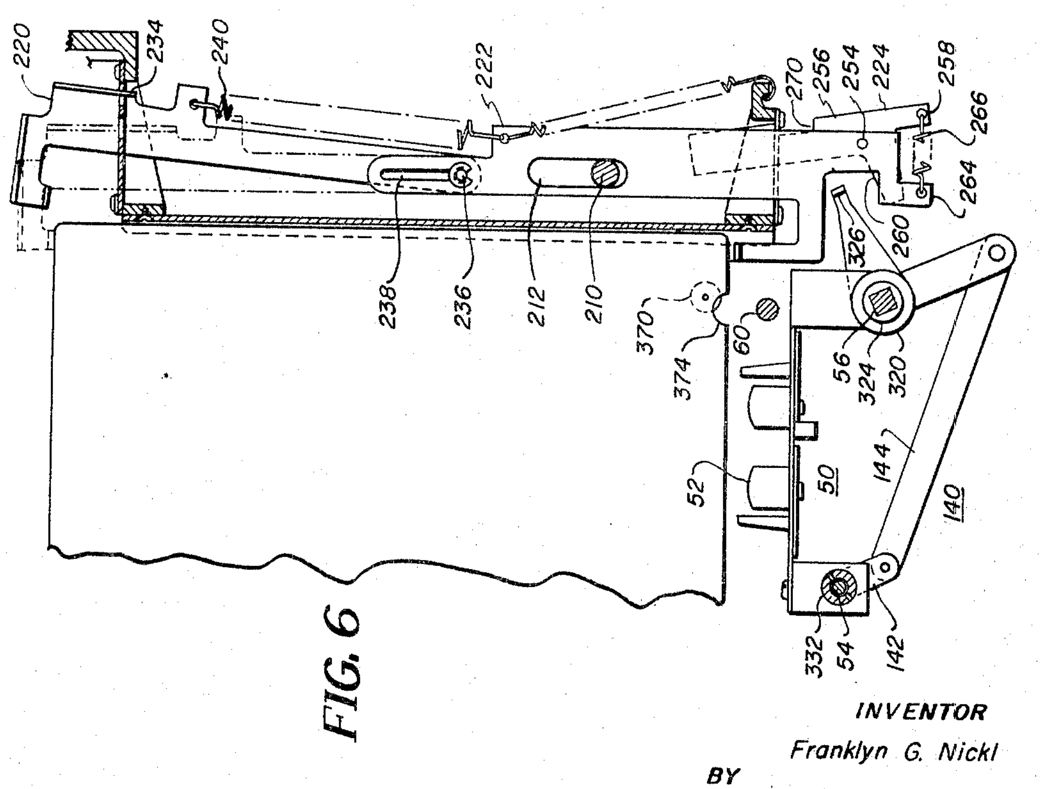
FIGURE 6 is a partial bottom view showing the relation of the cartridge positioning mechanism and bell crank mechanism to a tape cartridge, the bell crank mechanism shown in its normal position.

The crank mechanism 140 is held in its normal position (as shown in FIGURE 6) with pointer tip 326 out of engagement with the lowest cartridge positioning mechanism although adjacent thereto.

When the motor 62 is energized, flywheel 68 and capstan 60 rotate. Solenoid 92 is energized, elevating the pin clutch 80 into engagement with the rotating flywheel, and meshing gear 86 with the engaging spur 102 of intermittent multilevel gear assembly 100. Gear assembly 100 begins to rotate, turning through 180° of revolution. Rotation of multiple gear assembly 100 meshes the upper intermittent gear 106 to lead screw gear 112. As assembly 100 makes one half of a revolution, lead screw gear 112 makes one complete revolution to drive the lead screw 54 one complete revolution. One complete revolution of the lead screw causes the transducer assembly to rise one compartment spacing of 0.90 inch to a position adjacent the second or B compartment.

The flywheel continues to rotate and is in fact rotated constantly during the operation of the machine. The multiple level gear assembly 100 continues into a second half-revolution. During this second half-revolution, lead screw gear 112 is adjacent the recessed or root diameter portion 110 of gear 106 and does not rotate. The transducer assembly remains stationary adjacent the B compartment.

During this second halfcycle, the lower intermittent gear 120 meshes with the toothed portion of gear 128 and the crank mechanism 140 is actuated. As mentioned previously, gear 128 is directly connected to shaft 126 and both rotate jointly. Rotation of shaft 126 causes the rotatable arm 142 to rotate in a counterclockwise direction as viewed from the top. Connecting rod 144 is rotated at one end by arm 142 and converts the rotary motion to oscillatory motion. The oscillating motion is transmitted to pivotal arm 146 and this arm is thereby periodically pivoted about its axis to oscillate the bracing rod 56.

Figure 7:
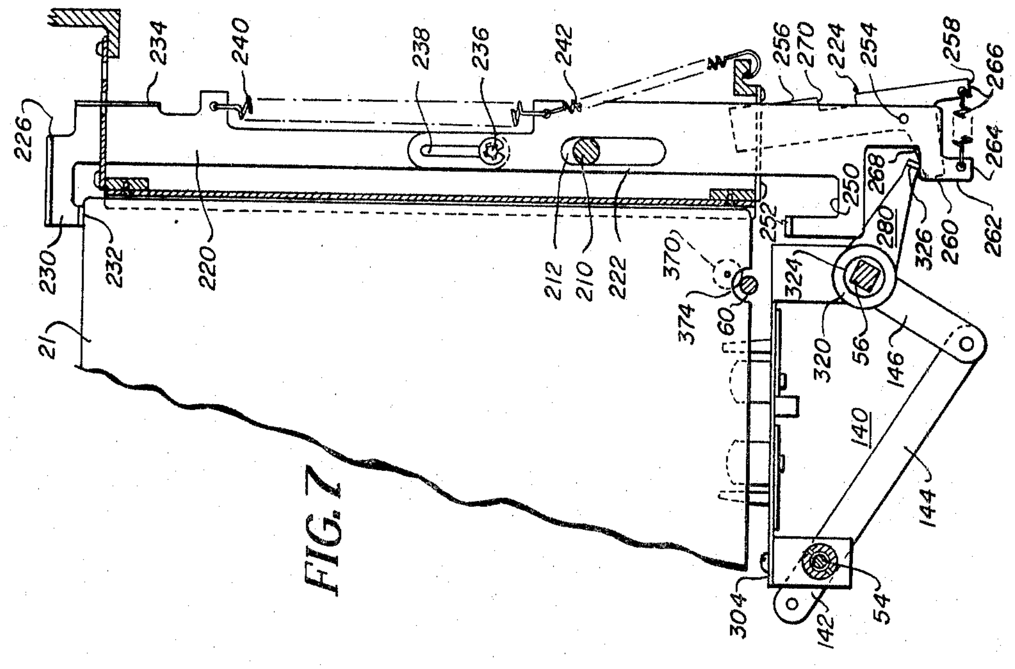
FIGURE 7 is a view as FIGURE 6 showing the bell crank mechanism in the tape playing position.

At this time, intermittent gear 120 rotates through an arc to rotate the rotating arm 142 one half revolution from the position of FIGURE 6 to that of FIGURE 7. The bracing rod 56 moves through an arc directed away from the central cavity 36 and carries pointer arm 280. The pointer arm moves rearwardly and its actuator tip 326 pushes both the rear link 224 and the intermediate link 222 rearwardly. The stepped tip 326 acts on both the T leg 260 of link 224 and the stepped portion 262 of link 222 to draw the entire cartridge positioning mechanism 22 of the B compartment rearwardly. The front link 220 is drawn rearwardly so that its front push finger 232 pushes the cartridge in the B compartment rearwardly. As the cartridge is moved rearwardly, the tape reaches the guides 314 and 315 and is vertically aligned by guide fingers 316 for positoning with respect to the heads. The cartridge is pushed and contact is made between the rotating capstan 60, the tape 310 and roller 370, The tape plays a selection while in this play position.

At the conclusion of play period, solenoid 92 is again actuated. Actuation of the clutch solenoid 92 at this time finds the lower intermittent gear 120 in mesh with the crank mechanism drive gear 128, approximately midway along the toothed portion 122 of gear 120. The gear train therefore drives the oscillating bracing rod 56 toward the cavity 36. Actuating tip 326 on pointer 280 leaves its engagement with links 222 and 224 and is pivoted toward the central cavity 36. The pointer arm continues until the actuator tip strikes the rear of hook 250 on link 222 and drives link 222 forwardly. Rear push finger 252 acts on the rear of the cartridge to push it out of contact with capstan 60 and forwardly to the ready position. This action occurs as the lower intermittent gear 120 completes its active half revolution, and the upper intermittent gear 106 is again approaching the start of its active half-cycle.

*Electrical circuitry*

Figure 10:
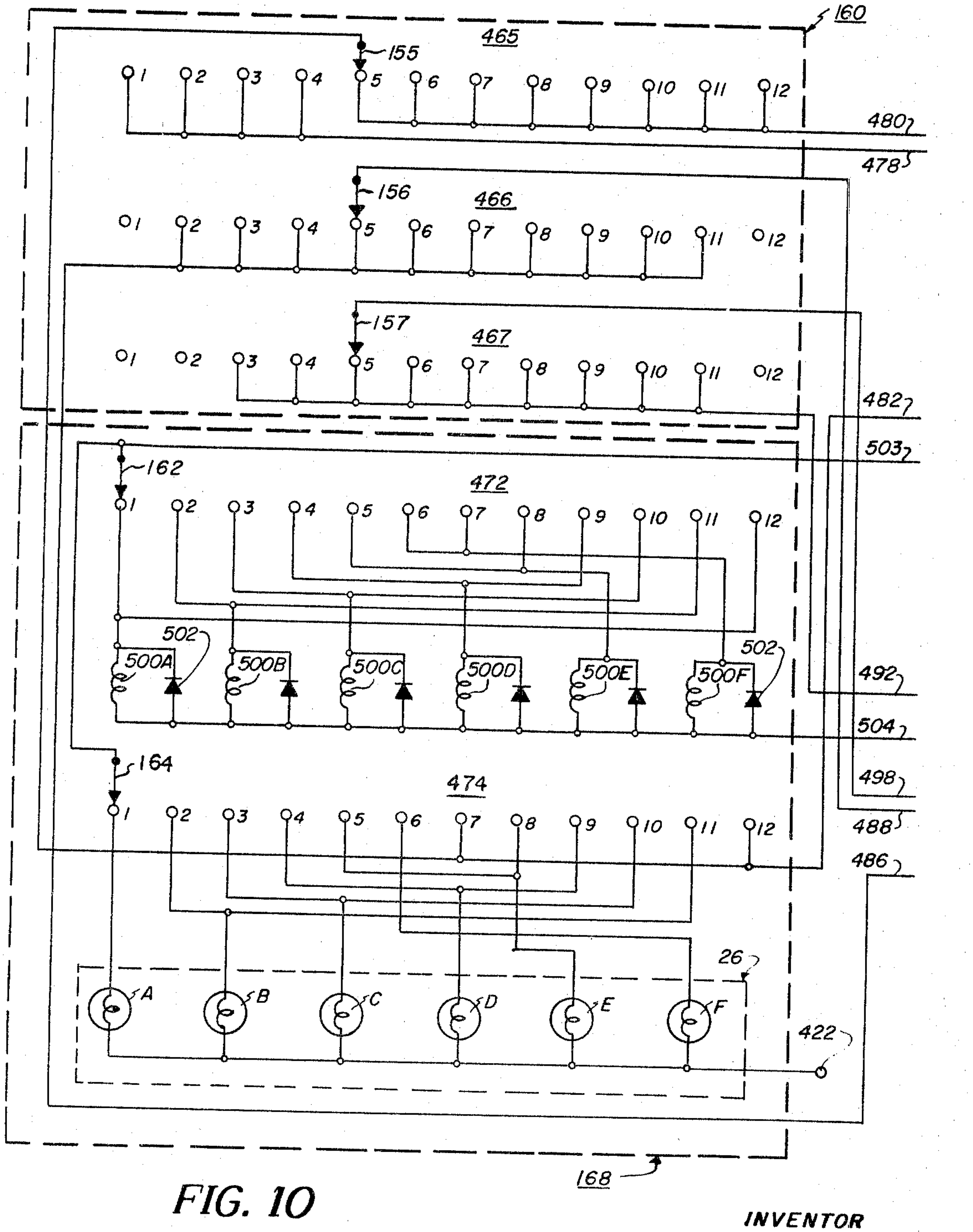
FIGURES 10 and 10A are schematic circuit diagrams of the apparatus, viewed with FIGURE 10A to the right of FIGURE 10.
Figure 10A:
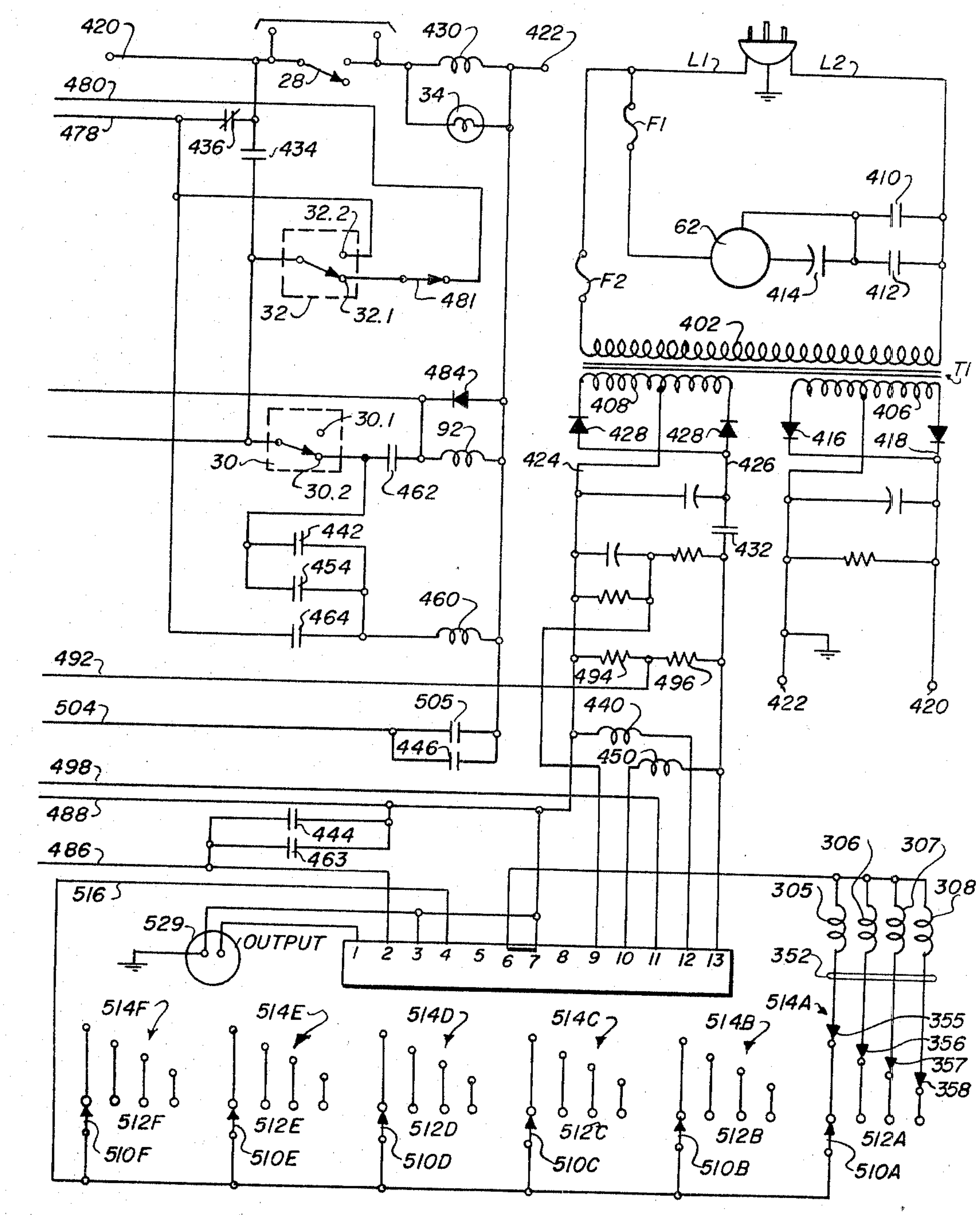
Figure 11:
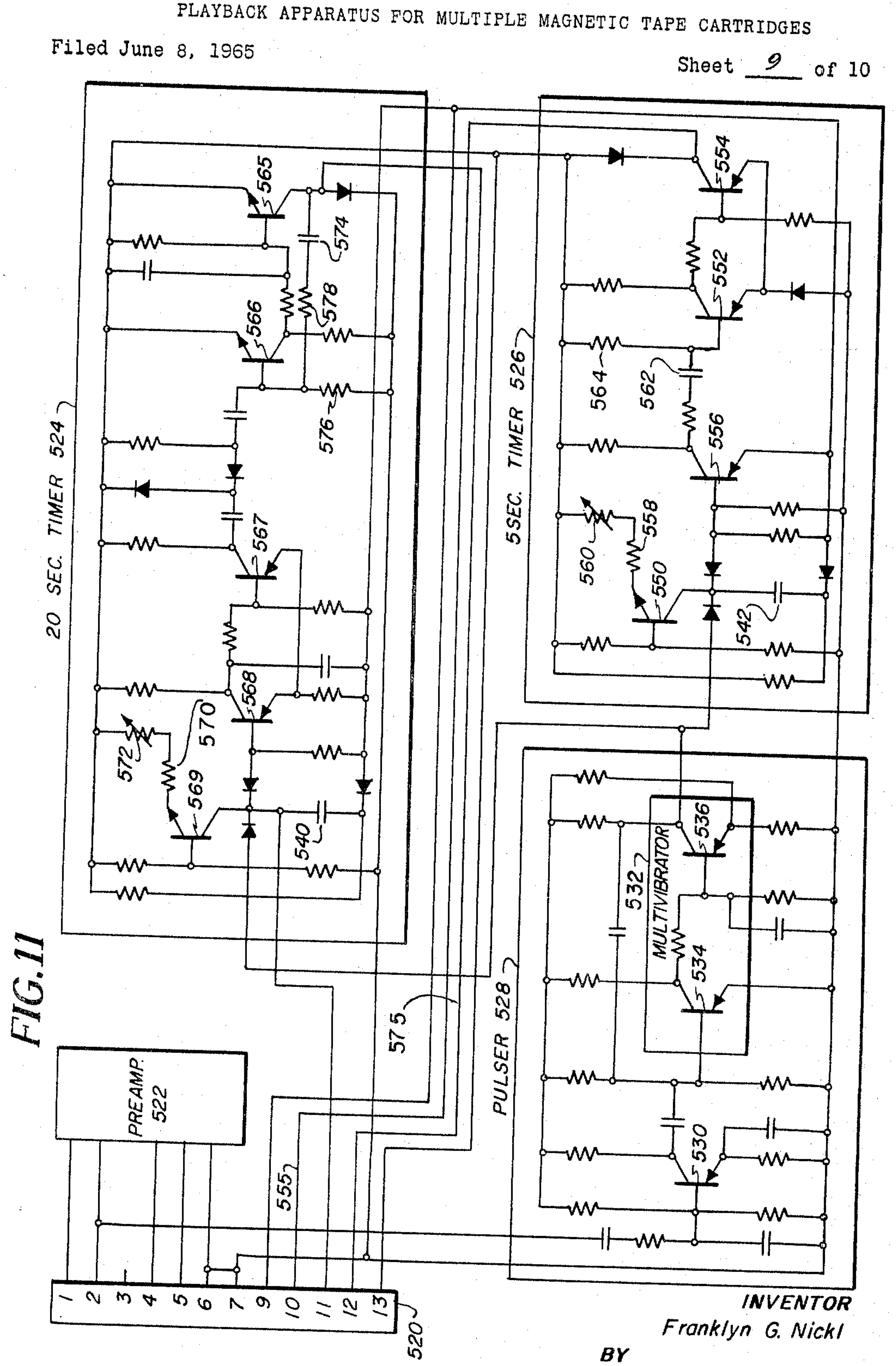
FIGURE 11 is a schematic circuit diagram of preamplifier circuit elements utilizable with the present apparatus.

The electrical circuitry utilized in the present apparatus is shown in FIGURES 10 and 10A. (FIGURE 11 shows the preamplifier circuit used with the apparatus.)

In these figures, there is shown a standard grounded 110 volt plug 400 for connection to a source of 60 cycle single phase, alternating current. The leads or conductors L1 (fused) and L2 (nonfused) are connected across the terminals of the primary 402 of a step down transformer 404, which has two low voltage secondaries 406 and 408. Also connected between leads L1 and L2 is the drive motor 62. This motor is connected directly to lead L1 while there is a multiple path leading from the motor to lead L2. One path to conductor L2 passes through normally open contacts 410 of clutch solenoid 92. A second path to conductor L2 includes normally open contacts 412 (responsive to On-Off switch 28) in series with capacitor 414 (the start capacitor for motor 62) and in parallel with contact 410. This capacitor would be omitted for a split phase motor, listed as an alternative. Thus, with both the clutch solenoid 92 restored and On-Off switch 28 in the Off position, motor 62 is inoperative.

One secondary 406 of transformer 404 is centertapped with rectifiers 416 in the opposed outer legs 418 to provide positive 25 volts direct current between the commoned outer leg 420 and ground at the center tap conductor 422.

The other secondary 408 is used to produce a potential difference of 18 volts DC between the ground potential of its center tap lead 424 and the −18 volts of its commoned outer legs 426. The output of secondary 408 is converted to full wave rectified direct current by the action of rectifiers 428 in the outer rectifier legs 426.

In the direct current circuits so produced, there are four relays which act to control the sequencing, advancing, and timing. The first relay 430 may be called the control relay, and its winding is connected across source leads 420 and 422 in series with On-Off switch 28. In parallel with the winding of relay 430 is the power light 34 indicative of the condition of the apparatus as On or Off.

The first set of contacts of relay 430 are normally open contacts 412 controlling the operation of motor 62. Relay 430 has a second normally open set of contacts 432 controlling the application of current from the −18 volt conductor 426, a third normally open contact set 434 controlling the application of current from the +25 volt lead 420, and a normally closed contact set 436 controlling the application of current from source conductor 420 to the first four stationary contacts of lever 465 of switch 160. Contacts 436 also maintain an alternate restoring path to solenoid 92 (as will be explained later).

A second relay 440, the track advance relay, has its winding connected between the common ground lead 424 and the terminal 12 on terminal block 490. This relay has three normally open sets of contacts 442, 444, and 446. The relay is energized to close these contacts on receipt of an output signal through terminal 12 from a long duration silence sensing circuit. Closure of contacts 442, 444, and 446 starts a move or transfer cycle of the transducer assembly and switching of tracks.

A track advance relay 450 connected between the source lead 424 and terminal 13 of terminal block 490 controls one normally open contact set 454. Relay 450 responds to an output signal from a short duration silence sensing circuit to close its contacts 454 in the operating path to relay 460. Relay 460 is a hold relay having normally open contact sets 462, 463, and 464 and is utilized to cycle the transfer of the transducer assembly on each cartridge advance or track advance. This relay locks itself operated over its own contacts 464 to effect this cycling through the closure of contacts 462. Contacts 463 on closure shunt out the transducer output, as will be described.

As mentioned previously, there is a three-level switch 160 with its three levels of contacts traversed by the respective wipers 155, 156, and 157. Each level 465, 466, and 467 respectively, has twelve contacts equally spaced apart in an endless ring. The wipers are commonly rotated to make one full revolution across their respective twelve-contact banks for each revolution of the intermittent gear assembly 100. The switch 160 has a normal or standby position in which the wipers are resting on the fifth contact of the level, and a play position in which the wipers are resting on their first stationary contact.

In addition, there is the second multilevel switch 168 with its wipers 162 and 164 which are commonly driven by gear train 154 to drive the respective wipers across contact banks 472 and 474, one step for each complete revolution of the intermittent gear assembly 100. These switches each have twelve contacts spaced equally, in an endless ring so that a complete revolution on these switches is completed for twelve advance cycles of the transducer assembly, i.e., a complete upward and downward traverse of the six cartridge compartments.

Turning to the switch 160, the contacts of the levels 465, 466, and 467 are multiplied or connected in various patterns to perform their required functions as will be explained.

On level 465, the first four contacts are commonly connected to a conductor 478 for connection to a number of relay and switch contacts, i.e., contacts 436, normally open contacts of switch 32, and contacts 464. The last eight contacts of the twelve on level 465 are multiplied to a conductor 480 leading to the normally closed contacts of switch 32. In conductor 480 there is a normally closed contact set 481 which is timer operated, if desired, to open and inactivate the playback output. A standard timer (not shown) closes contacts 481 when it is desired that the sound system be activated. In a business establishment, contacts 481 might close at 8:00 a.m. to play music and might shut off at 5:00 p.m. when sound output is not desired. The wiper 155 of level 465 is connected to the seventh and twelfth contacts of level 474 of switch 168, and to conductor 482 leading to a poling rectifier 484 in parallel to the junction of the winding of solenoid 92 and contacts 462. This switch level 465 controls the cartridge transfer cycling of the transducer head assembly.

The next level 466 of switch 160 is used to shunt the transducer output during transfer. The first and twelfth contacts on level 466 are blank while the remaining contacts are multiplied to conductor 486, from which a path leads in parallel through contacts 444, 463 to terminal 2 on terminal block 490. Wiper 156 of switch 160 is connected through conductor 488 of the 7 terminal of block 490 to compelte the shunt of the transducer heads during transfer cycling.

The next level 467 has its first, second, and twelfth contacts blank while the remaining contacts are multiplied to a conductor 492 leading through the junction of resistors 494 and 496 to the 18 bolt source. The wiper 157 of this level is connected to conductor 498 leading to terminal 11 on block 490. This switch level acts to reset the short duration timing circuit on receipt of a sound signal.

Connected to the respective contacts of level 472 of switch 168 are the six track solenoids 500, numbered A–F representing the respective cartridge compartments. Each solenoid 500 is connected to two contacts of the level 472, solenoid A to the first and twelfth contact, solenoid B to the second and eleventh, solenoid C to the third and tenth, solenoid D to the fourth and ninth, solenoid E to the fifth and eighth, and solenoid F to the sixth and seventh. Each solenoid has a diode 502 in parallel therewith for isolating the solenoid from reverse or stray impulses. The wiper 162 of level 472 is connected to the wiper 164, the wipers commoned to conductor 503 leading to the source conductor 420. A multiple connection from solenoids 500 is made to a conductor 504 which in turn leads to a parallel switch combination of normally open contacts 446 (of relay 440) and normally open contacts 505 of a manually operated track advance switch. Contacts 505 are the type which close instantaneously on depression of their switch, and which normally restore on release of the manual pressure.

The contacts of level 474 of switch 168 are connected to the lamps of indicia 26 to indicate the respective cartridge, playing at any one time. The lamp representing the A cartridge is connected to the first contact of level 474, the B lamp to the second and eleventh, the C lamp third and tenth contacts, the D lamp fourth and ninth contacts, the E lamp the fifth and eighth contacts, and the F lamp to the sixth conact. The seventh and twelfth contacts are connected to lead 482 as will be explained. The wiper 164 of this level is multiplied with wiper 162 to conductor 503 and contacts 434 to source conductor 420.

The track control solenoids 500 A–F operate individual control wipers 510 A–F. These wipers 510 A–F each are individually movable across their individual banks of four contacts 512 A–F. The contacts of each bank represent the transducer which registers with the individual tracks of the tapes. Thus, on bank 512A, the first contact represents transducer 305 for the first track, the second contact the transducer 307 for the second track, etc. These bank contacts are each connected to an individual stationary contact of sets 514 A–F. The contacts of set 514 are positioned to be conductively engaged by the respective spring contacts of movable set 352. Set 352 as mentioned previously, is movable vertically with the transducer assembly. With assembly 50 adjacent the A compartment, the A set of contacts 514 are individually engaged by the contactor springs 355–358.

The wipers 510 A–F are connected at their stationary end in multiple to a conductor 516 leading to terminal 4 of terminal block 490 and the preamplifier circuits. Thus, with the 510A wiper resting on the first of its four contacts, and transducer assembly positioned adjacent the A compartment, transducer 305 which is aligned to transduce the first track on the tape is activated.

Summarizing the last-mentioned feature, the position of the transducer assembly 50 adjacent a compartment determines the tape cartridge to be played, and the position of wiper 510 for the compartment adjacent the assembly 50 is determinative of the track on that tape to be played.

*The preamplifier*

The preamplifier shown in FIGURE 11 is not considered to be novel per se, and will be described only in so far as is necessary to understand the operation of the control circuit of FIGURES 10 and 10A.

The preamplifier is fed through a Preamplifier Terminal Block 520 whose terminals match the like numbered terminals on Control Circuit Terminal Block 490.

The preamplifier contains four sections, the Intermediate Amplification Stage 522, a Long Duration Silence Sensing Circuit 524, a Short Duration Sensing Circuit 526, and a Pulsing Circuit 528 common to both Sensing Circuits.

Figure 12:
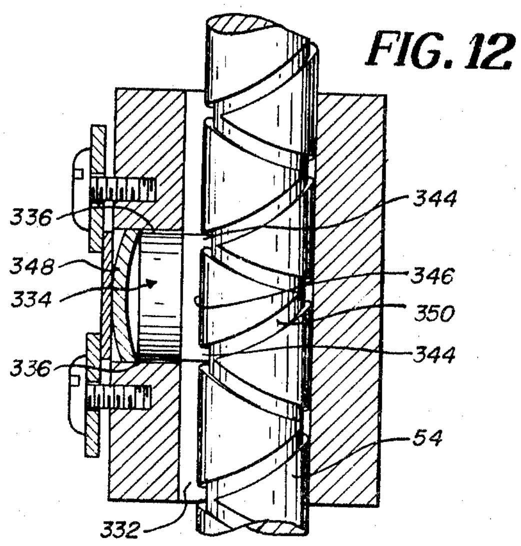
FIGURE 12 is a view in elevation of the mounting detail of the transducing head assembly.
Figure 13:
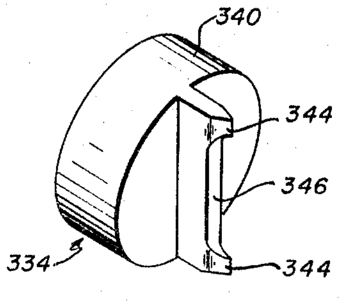
FIGURE 13 is a perspective view of the driving dog utilized in the mounting detail of FIGURE 12.

The amplification stage 522 provides a measure of amplifications for the sound output and is well-known to those versed in the art and need not be explained here. The output of stage 522 is connected through terminals 1, 2, 4, and 6 of blocks 520 and 490 to output plug 529 in FIGURE 12A. This plug receives a jack from whatever speaker or speakers are to be employed to emit the sound output of the apparatus.

The pulsing circuit 528 has a first transistor 530 which acts as a voltage amplifier to supply a triggering signal to a monostable multivibrator 532 made up of transistors 534 and 536. This multivibrator detects the presence or absence of the sound signal received from the tape track being played through terminal 4 of blocks 490 and 520. As long as a sound signal is being fed to the base of transistor 530, transistor 536 delivers pulses of current to timing capacitors 540 and 542 within the sensing circuits to keep these capacitors charged. The charging impulses are constant in amplitude and length as long as a sound signal is present at amplifier transistor 530. Absence of a sound signal depletes the charge on these capacitors to initiate their timing cycles.

As mentioned previously, each endless track on each tape has sound signals recorded thereon. The sound selections provide an output or sound signal for the duration of the signal. Between each selection, there is an unrecorded area on the track which lasts for more than 5 seconds. Thus, each track may be considered as a series of signal areas each separated by a blank spacing greater than 5 seconds. Although endless, each track has one area with no selections which is considered to be the end of the tape and naturally also the start. This area is characterized by lack of signal area slightly greater in length than 25 seconds of tape traverse.

In summary, each tape track has a plurality of signal areas (selections) spaced apart by short duration lack of signal areas and each track has one long duration lack of signal area. It is these short duration and long duration silence areas or silent periods which circuits 526 and 524 respectively sense and respond to.

Transistors 550, 552, 554, and 556, capacitor 542, resistor 558, and potentiometer 560 comprise the major elements of circuit 526 which senses a short duration silent period (taken to mean a 5 second silent period in the present example). As long as timing capacitor 542 is continuously charged from transistor 536, output transistor 554 does not conduct. When the charging impulses from transistor 536 cease, capacitor 542 begins to discharge through a path made up of transistor 550, resistor 558, and potentiometer 560. The discharge rate is set for approximately 5 seconds and is adjustable by potentiometer 560. At the end of the 5-second period, transistor 556 conducts and triggers the Schmitt trigger made up of transistor 552 and 554. Transistor 554 once triggered delivers an $\frac{8}{10}$ second output pulse from its collector to conductor 555. The output pulse is transmitted through terminal 10 to the cartridge advance relay 450. The length of this output pulse is determined by the R–C combination of capacitor 562 and resistor 564, and is of sufficient length to energize the relay and start a transfer cycle.

The 5-second silence sensing circuit 526 is not reset until the presence of a sound signal starts the charging pulses once more. This failure-to-reset feature is important in that it allows the 20-second sensing circuit to cycle following the transfer to a cartridge and sense the end of a tape silence area of the new cartridge without cartridge transfer interfering.

Transistors 565–569, capacitor 540, resistor 570, and potentiometer 572 comprise major elements of circuit 524 that senses a 20-second silent period. As long as timing capacitor 540 is charged from transistor 536 of the pulsing circuit, output transistor 567 does not conduct. When the charging pulses from transistor 536 cease, capacitor 540 begins to discharge through a path made up of transistor 569, resistor 570, and potentiometer 572. The discharge rate is set for approximately 20 seconds and is adjustable by potentiometer 572. At the end of a 20-second silent period, transistor 567 will conduct. When transistor 567 conducts, it pulses the one-short multivibrator made up of transistors 565 and 566. The track advance relay 440 is the collector load for transistor 565 (through conductor 575 and terminal 12), and it receives an $\frac{8}{10}$ second pulse when the multivibrator is triggered. The length of the pulse is determined by capacitor 574 and resistors 576 and 578.

Once the 20-second silence sensing circuit 524 has pulsed, it does not operate again to energize the track advance relay 440 until timing capacitor 540 is charged by pulses from transistor 536 or by direct current applied by conductor 498 and wiper 157 of wafer switch level 467. The 20-second silence sensing circuit is reset by the wafer switch level 467 once a transfer to a new cartridge has been effected thereby to bypass defective or broken tapes encountered on transfer.

*Circuit operation.—Mixed sequence play*

Assuming as a starting condition that the main power switch 28 is off, all six cartridge compartments 20 have tape cartridges therein, and that all cartridge positioning mechanisms 22 are cocked to hold their respective cartridges 21 in the ready position. Sequence Control switch 32 is in the Mix position, which means that one selection on one cartridge is to be played, followed by play of a selection on the next cartridge, and so on for one selection on each cartridge. The sequence of play of the cartridges is as follows: A, B, C, D, E, F, E, D, C, and B.

At this time, it will be assumed that the transducer assembly 50 is adjacent the A cartridge. The switch levels 472 and 474 of switch 168 have their wipers 162 and 164 resting on their respective first contacts. Switch set 352 is in registry with the A set of contacts 514 indicating that the transducer assembly is adjacent the lowermost or A cartridge. Swich levels 465, 466, and 467 of switch 160 have their respective wipers 155, 156, and 157 resting on their fifth contacts the standby position as marked in FIGURES 10 and 14.

When main power switch 28 is closed, control relay 430 is energized over an obvious path and power lamp 34 is lighted. On energization, relay 430 closes the normally open contacts 412, 432, and 434 and opens its normally closed contacts 436.

At contacts 412, the circuit to drive motor 62 is closed to the power leads L1 to L2, and the motor begins its rotation. The motor 62 rotates to drive flywheel 68 and capstan 60. As long as the main power switch 28 is closed, relay 430 remains energized and contacts 412 remain closed. Thus, the capstan and flywheel rotate continuously during operation of the apparatus.

Contacts 432 of relay 430 close to provide −18 volt direct current for the preamplifier of FIGURE 11 through the 13 terminals of joined terminal blocks 490 and 520.

Contacts 434 of relay 430 also close and prepare power circuits to clutch solenoid 92, to track advance solenoids 500 A–F and to lamps 26. The circuit to solenoids 500 is closed from source lead 420 to wiper 162, and solenoid 500A, a circuit open at contacts 446. Lamp 26A is energized through wiper 164 to power lead 422. A circuit is closed from conductor 420 through closed contacts 434, switch 32 closed to its normal contact 32.1, closed contacts 481, conductor 480, standby contact of switch level 465, wiper 155, conductor 482 and solenoid 92 to source conductor 422. The solenoid is energized to couple the multilevel intermittent gear assembly 100 to the rotating flywheel 68. A the angular position of gear assembly 100 (wiper 155 resting on the standby contact of switch level 465) the upper intermittent gear 106 is starting to mesh with the level screw gear wheel 112 to advance the transducer assembly 50 to the next cartridge (B)—in the manner described previously. As the transducer assembly is advanced to the B cartridge, the wipers 162 and 164 of switch levels 472 and 474 are stepped to their second or B contact. The contact spring set 452 is moved with the assembly 50 to engage the stationary contacts of the 514B set.

Switch level 472 is inactive at this time due to open parallel combination of contacts 446 of relay 440 and contacts of track advance switch 505. Thus, no track shifting takes place. The lamp for the second cartridge B is now lighted over a path from source conductor 420 through contacts 434, conductor 503, wiper 164, the second contact of level 474 and lamp 26B to source conductor 422.

A circuit is also completed to the transducer heads to energize the transducer 305 of head 51 (for the first track). The circuit from the transducer is completed to the preamplifier over a path from terminal 6 of block 490, through transducer 305, spring 355, contact 514B–1 and conductor 516 to terminal 4 of block 490. No play will occur since the tape cartridge B has not yet been physicaly advanced from the ready position to the play position in which the tape drivingly contacts the capstan. In addition, a bypass circuit remains closed at this time to shunt out the transducers during movement of the cartridge positioning mechanism. The bypass circuit may be traced from terminal 7 of block 490 through conductor 488, wiper 156, any of the contacts 10–12 and 1 of level 466, and lead 486 to terminal 4.

At this point in the cycle, with the wipers 155, 156, and 157 resting on the tenth contacts of the levels of switch 160, solenoid 92 remains energized. Thus the intermittent gear assembly 100 remains in mesh with clutch gear 86. The upper intermittent gear 106 now has its recessed portion 110 adjacent the level wind gear 112, so no further movement of the transducer assembly occurs. The lower intermittent gear 120 is starting to mesh with the crank mechanism gear 128. The crank mechanism is thereby actuated to move pointer arm 280 rearwardly against link 224 of the B compartment. This link 224 is moved rearwardly releasing notch 270 from slot 206. Arm 280 pushes links 222 and 224 to their rearmost position to move the B cartridge positioning mechanism and the B cartridge into the play position. The B cartridge tape is advanced by this movement into contact with capstan 60. The tape cartridge is held in this position by the engagement of pointer arm 280 with links 222 and 224. This condition is reached as wipers 155, 156, and 157 reach their respective twelfth contacts of switch 160.

On both levels 466 and 467, the twelfth contact is blank. The blank contact on level 466 opens the circuit in the bypass to the transducers 305–308, so that subsequent play of the tape may occur. On level 467, the open circuit at the twelfth contact begins what is termed a silent signal or absence of signal period by opening the input path to the timing capacitor 540 of the 20-second timing circuit 524 through terminal 11 of terminal blocks 490 and 520. This absence of signal period begins a 20-second timing cycle as the intermittent gear assembly is rotated further.

When wiper 155 leaves the twelfth contact of level 465 and approaches the first contact, the circuit through conductor 480 to clutch solenoid 92 is opened. The solenoid restores, and drops its clutch 80 out of engagement with drive gear 86, and intermittent gear assembly 100 is stopped in an angular position in which the wipers of switch 160 are resting on the first contacts.

The transducer bypass remains open at level 466, its first contact being blank, and the 20 second timing circuit is now timing due to the open contact encountered on level 467. Clutch solenoid 92 remains deenergized due to the previously described open circuit through conductor 482. The period of time having elapsed during the aforementioned transducer assembly transfer and cartridge advance will be about $\frac{8}{10}$ of a second.

Switch 168 has its wipers resting on their second or B contacts to energize the B lamps 26 indicating to a viewer that a selection on the B tape is now playing. During the selection, periodic pulses or sound signals are transmitted from the preamplifier to both the 5-second and 20-second sensing circuits 526 and 524, both having been reset on the receipt of the first sound signal received from the preamplifier 522. Sound signals from the tape are transduced by transducer 305 and the signal passes to the preamplifier 522. From the preamplifier, the sound signal is transmitted to further amplifiers and speakers for play of the music or sound.

At the conclusion of the selection, the preamplifier receives no further signal, hence no sound signals can be transmitted to the 5 and 20-second sensing circuits. These circuits begin their timing function at this signal termination. After five seconds of silence have elapsed an output pulse is emitted from triggering transistor 554 on lead 555 through terminal 10 of blocks 520 and 490 to the winding of relay 450, the cartridge advance relay. Relay 450 operates and closes its contacts 454. At contacts 454, an operating path is closed to hold relay 460 from source conductor 422 through the winding of relay 460, contacts 454, contacts 30.2 of switch 30, and contacts 434, to source conductor 420. Relay 460 operates and closes its contacts 462, 463, and 464. Contacts 462 close an obvious circuit through switch 30 and contacts 434 to energize the clutch solenoid 92. Relay 450 restores once the output pulse from the silence sensing circuit has terminated, relay 450 having remained energized long enough to energize relay 460.

Contacts 463, on closure, complete a bypass to the transducers similar to the bypass described previously for the prior transfer. Relay 460 locks itself operated through its own contacts 464 in parallel with a path from solenoid 92 through contacts 462. These circuits remain closed as long as wiper 155 engages the first four contacts of level 465.

Recapping briefly, switch 160 holds its wipers resting on the first contact during play. At the end of the selection, both the short duration and long duration silence sensing circuits are started into their timing operations. After the expiration of 5 seconds, the 5-second sensing circuit will emit an output pulse. This pulse will initiate the cartridge transfer to the next or C cartridge. Until a sound signal is received from the new cartridge, the 5-second sensing circuit is not reset. The 20-second silence sensing circuit, however, is reset on each transfer by a pulse received from level 467 when wiper 157 reaches any of the contacts 2–11 on level 467. The first contact of this level (467), the play position contact, is blank on level so that no reset pulse is generated prior to the actual play of a tape.

If the end-of-tape silent period is adjacent the transducer head on the track on the C tape (the tape now adjacent the transducers), the head will transduce no signal. The 5-second signal circuit will be inoperative since it was not reset by a sound signal after having received the last output pulse from the prior tape (B). The 20-second circuit will operate through its timing cycle, since it was reset during the transfer cycle by the pulse from level 467. The track adjacent the energized transducer, assumed to be track 1 on tape C, will have passed 5 seconds into its long duration silence area during an earlier cartridge transfer cycle. The tape track will be transduced for the 20-second period necessary to cause the 20-second sensing circuit to emit an output pulse on lead 575 and terminal 12. This pulse completes a circuit to relay 440 which operates. Operation of relay 440 closes its contacts 442, 444, and 446. Contacts 442 on closure complete a circuit to relay 460. Contacts 444 close to shunt out the transducer heads during the transfer which is to take place. Contacts 446 close a circuit to the track advance solenoid 500B to energize the solenoid to shift its wiper 510B to the next track (2). The wiper will remain on this second track to energize the transducer 306 whenever tape C is encountered. Relay 440 remains operated only momentarily and then restores.

Once relay 460 is energized, it closes its contacts 462, 463, and 464 to effect a cartridge transfer to the next or D cartridge, in a manner similar to that described previously. By utilizing this reset of the 20-second circuit only during each transfer, a cartridge transfer is effected each time a track shift occurs. In this way, the cartridge transfer cycling will cause the transducer heads to step over a broken tape or missing cartridge, since either of these occurrences will cause a long duration silent period analogous to the end-of-tape signal.

In addition, if power switch 28 is opened, relay 460 remains operated over its own contacts 464, and keeps contacts 462, 463, and 464 during transfer closed to maintain the clutch solenoid 92 energized over an alternate path until switch 160 has returned to the normal or standby position with its wipers adjacent the fifth contacts.

This alternate path to solenoid 92 may be followed from source conductor 420 through closed contacts 436 (relay 430 having restored on opening of power switch 28), any one of the contacts 1–4 of level 465, wiper 155, lead 482, and clutch solenoid 92 to the other source conductor 422. When the switch 160 has stepped its wipers to the fifth contact, the alternate path is opened, and clutch solenoid 92 releases.

*Continuous play*

If the sequence control switch 30 is in the continuous position (closed to contact 30.1) when the main power 28 is turned off, clutch solenoid 92 is energized to step the switch 160 automatically from contacts 1–4 to the fifth contact (standby position), over a path through now closed contacts 436. If power switch 28 is opened with switch 160 in any other than 1–4 position, the switch will remain in that position. When switch 28 is later reclosed, switch 160 will have its wipers on a contact in the group from 5 to 12. A path will be closed to clutch solenoid 92 to position the transducer assembly for play and will step the wipers of switch 160 to contact the first contact or play position. This path may be traced from source conductor 420 through now closed contacts 434, contacts 32.1 of switch 32, contacts on level 465, wiper 155, conductor 482, solenoid 92, to source conductor 422. Naturally, the cartridge transfer gears will move the tape cartridge to its play position adjacent the transducers. One cartridge track (the one adjacent the then energized transducer) will be played completely through by the adjacent transducer with no cartridge transfer or track shift.

On occurrence of a 5-second silent period (at the end of each selection on the track) cartridge advance relay 450 will be pulsed momentarily. Hold relay 460 will not operate since its operating circuit is now permanently open at switch 30 and contacts 30.2. Thus, with sequence switch 30 in its continuous play position, automatic cartridge transfer cannot take place.

A similar condition arises when a 20-second silence is sensed by relay 440. Relay 440 will operate momentarily. Momentary operation of relay 440 will close contacts 446 long enough to energize the track advance solenoid 500 for the cartridge which is being played. The transducer playing the cartridge will be deenergized, and the transducer adjacent the next track will be energized to effect a simple type track shift. Again, with the sequence switch 30 open, no cartridge transfer will occur since relay 460 cannot operate.

When it is desired to play a tape cartridge other than that being played, advance switch 32 is momentarily depressed manually to close to its contacts 32.2. This closure completes a path from source conductor 420 through contacts 434, 32.2 of switch 32, any of contacts 1–4 of level 465, wiper 155, conductor 482, and the winding of clutch solenoid 92 to source conductor 422. This momentary depression of switch 32 must be long enough to allow wiper 155 to reach the fifth contact (standby position). The switch movement stops when the fifth contact is reached, and switch 160 remains inactive until switch 32 is released. Switch 32 restores on its release, and recloses to its stationary contacts 32.1. Once switch 32 has been restored, clutch solenoid 92 is energized through the successive 5–12 contacts of level 465 to step the wipers of switch 160 to the play position (first contact). During this stepping of switch 160, the transfer mechanism is actuated to effect transfer movement of the transducer assembly to the next cartridge. At the conclusion of the transfer, the cartridge now adjacent the transducer assembly will play continuously on the track for which the transducer is energized, shifting tracks automatically at the end of each tape track, as previously described.

This continuous play will continue on this tape cartridge until a cartridge transfer is effected by subsequent operation of switch 32 or until the apparatus is shifted to mixed play at switch 30.

What is claimed is:

1. In a magnetic tape playback apparatus of the type having a plurality of spaced compartments each adapted to bear therein a tape cartridge, the combination comprising:
   - (a) a tape transducer,
   - (b) a carriage assembly bearing said transducer,
   - (c) means for translatorily transferring said assembly between positions adjacent each of said compartments, and
   - (d) control means for conducting said transferring means through a sequence including a plurality of cycles, with said assembly being transferred from one compartment to the adjacent compartment during each of said cycles,
   - (e) said transferring means comprising:
     - (1) a double threaded lead screw rotatable in one direction to both raise and lower said carriage assembly,
     - (2) a gear drive mechanism,
       - (a) said gear mechanism including:
         - (1) first partial gear for rotating said lead screw a finite distance, the finite distance being the intercompartmental spacing, and
         - (2) a second partial gear, having a driving portion mutually exclusively related to the rotation of said lead screw by said first gear,
   - (f) a crank mechanism operated by said second gear,
     - (1) said crank mechanism operated in each cycle before and after the rotation of said lead screw, and
   - (g) means operated by said crank mechanism to advance the tape cartridge in the compartment adjacent said assembly into playback relationship with said transducer to complete a transfer cycle, and
     - (1) said last-mentioned means operated by said crank mechanism at the start of a transfer cycle to retract the cartridge out of said playback relationship.

2. A magnetic tape apparatus comprising:
   - (a) a plurality of tape compartments each designed to carry a magnetic tape,
   - (b) a transducer carriage assembly,
   - (c) transducing means mounted on said carriage assembly,
   - (d) means for moving said carriage assembly to position said transducing means in individual play positions adjacent each of said tapes,
   - (e) means for controlling the operation of said apparatus through a predetermined playback sequence including playback positions adjacent each of said tapes,
   - (f) means responsive to the movement of said carriage assembly into one of said play positions for directing the advance of the tape at said one position toward operative play relationship with the transducing means on said carriage assembly,
   - (g) common drive means, and
   - (h) an intermittent gear assembly driven by said common drive means and comprising:
     - (1) a first and a second drive member,
       - (a) said first member operable to move said carriage assembly,
       - (b) said second member operable to actuate said tape advance directing means, and
     - (2) a gear train driven by said gear assembly for cooperating with said controlling means to effect the sequence.

3. A tape playback apparatus including a plurality of spaced compartments, each adapted to hold a magnetic tape cartridge, and comprising:

(a) a transducer carriage assembly, (b) a plurality of transducing heads mounted on said assembly, (c) a common drive assembly, (d) a transfer screw extending past all said compartments, (e) means mounting said carriage assembly for movement on rotation of said screw to positions adjacent each of said compartments, (f) an oscillatory mechanism mounted for operation by said common drive assembly, (g) a drive structure operable by said common drive assembly only when said transfer screw is not operated for oscillating said last-mentioned mechanism, (h) tape advance mechanisms individual to each of said compartments and actuable individually to move the tape cartridge in its compartment into and out of transducing relation with said transducing heads, (i) said oscillatory mechanism when oscillated actuating the tape advance mechanism adjacent the carriage assembly, (j) further drive structure operable by said common drive assembly only when said oscillatory mechanism is not oscillated for rotating said transfer screw, and (k) said drive structures comprising coaxially mounted gears with angularly distinct spaced driving portions.

4. A magnetic tape apparatus comprising:

(a) a plurality of tape compartments each designed to carry a magnetic tape, (b) transducing means, (c) transfer means for moving said transducing means in one transfer plane to positions in said plane adjacent the tape in each of said compartments, (d) means for controlling the operation of said transfer means through a predetermined sequence including positions wherein said transducing means is cooperative with said tapes sequentially, (e) means responsive to said transducing means reaching a position in said transfer plane adjacent one tape for directing the movement of said one tape toward an operative play relationship with transducing means while said transducing means is retained stationary, and (f) means for holding said tape in said relationship for play of said tape.

5. A magnetic tape playback apparatus comprising:

(a) a plurality of juxtaposed tape compartments each adapted to carry a magnetic tape of the type having a plurality of recordings spaced thereon, (b) a carriage assembly, (c) transducing means mounted on said carriage assembly, (d) means for translatorily moving said carriage assembly to positions in which said transducing means is adjacent each of said tapes, (e) crank means mounted for operation by said moving means and moved therewith, (1) said last-mentioned means operative to direct the advance of the tape adjacent the transducing means into playback relationship with the adjacent transducing means and to retract the tape therefrom, (f) means for controlling the cycling of said apparatus to play back a recording from each of said tapes in sequence comprising, (1) means for actuating said moving means to move said assembly from one tape to the next, (2) means responsive to the completion of movement to the next tape for actuating said advance means into its operation, (3) means for bypassing said move actuating means and said advancing means during playback, (4) means responsive to an indication that the playback of a recording has been terminated for reoperating said advance means to retract the tape therefrom prior to the start of the cycle of movement to the next tape, and (5) said carriage assembly retaining said transducing means against movement in other than said translatory plane.

6. A magnetic tape apparatus comprising:

(a) a plurality of tape compartments each designed to carry a magnetic tape, (b) a transducer, (c) means for moving said transducer to individual play positions adjacent said tapes, (d) means for controlling the operation of said apparatus through a predetermined sequence of said tapes, (e) means responsive to the movement of said transducer into one of said play positions for directing the advance of the tape at said one position toward operative play relationship with said transducer means, and (f) an intermittent drive assembly comprising:

(1) a first member in said drive assembly operatively activatable to drive said transducer moving means, (2) a second member in said assembly operatively activatable for driving said tape advance directing means with said first and second members each activatable to operate its driven means during mutually exclusive periods, in a mutually exclusive manner, and (3) sequencing switches cooperative with said controlling means to effectuate said sequence.

7. A magnetic tape playback apparatus comprising:

(a) a plurality of juxtaposed compartments each designed to carry a magnetic tape cartridge, (b) transducing means, (c) a common drive motor, first means responsive to operation of said motor for moving said transducing means to individual play positions adjacent each of said cartridges, (d) means for controlling the movement of said transducing means through a predetermined sequence of cartridges, (e) individual means adjacent each compartment for setting the cartridge in that compartment into a preparatory condition, (f) advancing means responsive to the movement of said transducing means to one of said cartridges for advancing under control of said motor that cartridge when in a preparatory condition into operative play relationship with the transducing means, (g) means for holding said cartridge in said relationship for the play of said tape, and (h) means for driving said tape during said play in response to operation of said motor.

8. A magnetic tape playback apparatus having a plurality of juxtaposed tape bearing compartments, including:

(a) transducing means, (b) a carriage assembly bearing said transducing means, (c) a transfer mechanism for moving said assembly rectilinearly to positions adjacent each of said compartments, (d) means for rotating said transfer mechanism to align said carriage assembly adjacent one compartment, (e) individual linkages adjacent each compartment, (1) each said linkage individually slideable under control of said transfer mechanism in a first direction to advance the tape borne by the compartment into playback engagement with said transducing means, (f) means for imparting translatory movement to tapes in a playback operative position, (g) means operated consequent to said drive means having aligned the assembly adjacent one compartment for initiating the slide movement of said linkage adjacent said one compartment to place its tape in operative contact with said rotating means to play back said tape, (1) means for holding said slideably moved linkage to latch said tape in said playback position, and (h) means operated at the conclusion of playback for initiating the slide movement of said linkage in the opposite direction for removing the tape from said playback position.

9. A magnetic tape playback apparatus having a plurality of superposed, spaced tape bearing compartments, including:

(a) transducing means, (b) a carriage assembly bearing said transducing means, (c) a double-threaded transfer screw for moving said assembly to positions adjacent each of said compartments, (d) means for driving said transfer mechanism to position said carriage assembly adjacent one compartment, (e) individual translatory linkage mechanism adjacent each compartment, each said linkage mechanism individually slideable to advance the tape borne by the compartment into playback position in operative contact with said transducing means, (f) a rotating capstan extending past said compartments for imparting translatory movement to tapes in an operative position, (g) means mounted coaxiallly with said transfer screw operated consequent to said drive means having positioned the assembly adjacent a compartment for initiating the slide movement of the linkage mechanism adjacent said compartment to advance its tape into contact with said rotating capstan for playback of the tape, and (1) means for holding said linkage mechanism to maintain said tape in said playback position.

References Cited

UNITED STATES PATENTS

| | | | |
|---|---|---|---|
| 2,821,576 | 1/1958 | Gaubert | 179—100.2 |
| 3,001,025 | 9/1961 | Gaubert | 179—100.2 |
| 3,083;269 | 3/1963 | Gaubert | 179—100.2 |

BERNARD KONICK, *Primary Examiner.*

J. RUSSELL GOUDEAU, *Assistant Examiner.*